(12) United States Patent
Morrish

(10) Patent No.: US 6,967,688 B1
(45) Date of Patent: Nov. 22, 2005

(54) METHOD AND APPARATUS THAT REDUCES JITTER IN A DISPLAY BY PROVIDING TEMPORAL HYSTERESIS

(75) Inventor: Andy Morrish, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 495 days.

(21) Appl. No.: 09/905,392

(22) Filed: Jul. 13, 2001

(51) Int. Cl.[7] .......................... H04N 5/445; G09G 5/00
(52) U.S. Cl. ...................................... 348/497; 345/213
(58) Field of Search ...................... 348/497, 511, 512, 348/513, 514, 533, 540, 569, 536, 541, 547, 348/563–566; 345/213, 611; 375/371

(56) References Cited

U.S. PATENT DOCUMENTS

| | | | | |
|---|---|---|---|---|
| 4,677,484 A | * | 6/1987 | Pitsch et al. ................. | 348/533 |
| 4,729,025 A | * | 3/1988 | Yanase ......................... | 348/537 |
| 4,962,427 A | * | 10/1990 | Lunn et al. ................... | 348/555 |
| 4,962,428 A | * | 10/1990 | Tong et al. ................... | 348/555 |
| 5,051,817 A | * | 9/1991 | Takano ......................... | 348/569 |
| 5,150,201 A | * | 9/1992 | Mehrgardt et al. ........... | 348/662 |
| 5,828,808 A | * | 10/1998 | Kang ............................ | 386/68 |
| 5,859,634 A | * | 1/1999 | Ou et al. ..................... | 345/213 |
| 5,999,226 A | * | 12/1999 | Choi ............................ | 348/564 |
| 6,002,449 A | * | 12/1999 | Tsyrganovich ............... | 348/725 |
| 6,020,872 A | * | 2/2000 | Mizukata et al. ............ | 345/99 |
| 6,198,468 B1 | * | 3/2001 | Cho ............................. | 345/467 |
| 6,256,003 B1 | * | 7/2001 | Tsuchiya et al. ............. | 345/87 |
| 6,373,312 B1 | * | 4/2002 | Barnes et al. ................ | 327/261 |
| 6,486,919 B1 | * | 11/2002 | Kim ............................ | 348/497 |
| 6,532,042 B1 | * | 3/2003 | Kim ............................ | 348/537 |
| 6,556,249 B1 | * | 4/2003 | Taylor et al. ................ | 348/497 |
| 6,580,456 B1 | * | 6/2003 | Jacobs ......................... | 348/312 |
| 6,809,711 B2 | * | 10/2004 | Funston ....................... | 345/82 |

* cited by examiner

*Primary Examiner*—Paulos M. Natnael
(74) *Attorney, Agent, or Firm*—Merchant & Gould P.C.; Joshua W. Korver

(57) ABSTRACT

A method and apparatus is directed to reducing jitter of the position of an On Screen Display (OSD) associated with a display device. Multiple horizontal signals are produced in response to a vertical flyback signal and a horizontal flyback signal for the display device. Each of the multiple horizontal signals has a different phase. One of the multiple horizontal signals is selected such that its rising edge of the selected horizontal signal occurs at a separate time when compared to the rising edge of the vertical flyback signal. By ensuring that the rising edge of the selected horizontal signal is not coincident with the vertical flyback signal, jitter is minimized in the position of the OSD.

21 Claims, 19 Drawing Sheets

| Q1(n-1) | Q0(n-1) | FH1' | FH0' | Q1 | Q0 |
|---|---|---|---|---|---|
| 0 | 0 | 0 | 0 | 0 | 1 |
| 0 | 0 | 0 | 1 | 1 | 1 |
| 0 | 0 | 1 | 0 | 0 | 0 |
| 0 | 0 | 1 | 1 | 0 | 0 |
| 0 | 1 | 0 | 0 | 0 | 1 |
| 0 | 1 | 0 | 1 | 1 | 0 |
| 0 | 1 | 1 | 0 | 0 | 1 |
| 0 | 1 | 1 | 1 | 0 | 0 |
| 1 | 0 | 0 | 0 | 1 | 0 |
| 1 | 0 | 0 | 1 | 1 | 0 |
| 1 | 0 | 1 | 0 | 0 | 1 |
| 1 | 0 | 1 | 1 | 1 | 1 |
| 1 | 1 | 0 | 0 | 1 | 0 |
| 1 | 1 | 0 | 1 | 1 | 1 |
| 1 | 1 | 1 | 0 | 0 | 0 |
| 1 | 1 | 1 | 1 | 1 | 1 |

*Fig. 8*

METHOD AND APPARATUS THAT REDUCES JITTER IN A DISPLAY BY PROVIDING TEMPORAL HYSTERESIS

FIELD OF THE INVENTION

The present invention relates to a method and apparatus for an On Screen Display (OSD). In particular, the present invention relates to a method and apparatus for reducing jitter associated with an OSD window.

BACKGROUND OF THE INVENTION

On Screen Display (OSD) functionality is becoming more popular in the area of display devices. An OSD signal has two components, blanking and video. Blanking is used to replace a section of the normally displayed video with an OSD box, or window. The OSD window provides a background for symbiology provided by the OSD video signal. Digital logic is often utilized to initiate the timing signals for the OSD, which are then converted to analog signals that are utilized to generate the OSD image. Since an OSD is synchronized by analog signals, the OSD is susceptible to noise. Noise can affect the position of the OSD window, causing the OSD window to move up and down, or left to right. Noise can cause undesirable image artifacts that affect the readability of the OSD. The movement of the OSD window due to noise is often referred to as "jitter".

SUMMARY OF THE INVENTION

In accordance with the invention, an electronic circuit is directed to reducing the effect of noise on the vertical position of an On Screen Display (OSD). The electronic circuit produces multiple horizontal rate signals. Each of the horizontal rate signals has a different phase. An external vertical flyback signal is provided to the electronic circuit. If the phase of the vertical flyback signal and the horizontal rate signal are aligned too closely, then jitter in the OSD can occur. The jitter is caused by noise on the analog signals. The jitter can be manifested as a line count error in the vertical position of the OSD. The line count error can be eliminated by selecting a horizontal rate signal that has a different phase. This realigns the horizontal rate signal to a different phase in relation to the vertical flyback signal such that a line count error can be avoided. By reducing the line count error or eliminating the line count error, jitter on the displayed image of the OSD can be avoided.

Briefly stated, a method and apparatus is directed to reducing jitter of the position of an On Screen Display (OSD) associated with a display device. Multiple horizontal signals are produced in response to a vertical flyback signal and a horizontal flyback signal for the display device. Each of the multiple horizontal signals has a different phase. One of the multiple horizontal signals is selected such that its rising edge of the selected horizontal signal occurs at a separate time when compared to the rising edge of the vertical flyback signal. By ensuring that the rising edge of the selected horizontal signal is not coincident with the vertical flyback signal, jitter is minimized in the position of the OSD.

An embodiment of the invention is directed to an apparatus for reducing noise effects associated with the vertical position of an on screen display (OSD) image for a display device that uses a vertical flyback signal and a horizontal flyback signal in producing an image. The apparatus includes a clock signal generator that is configured to produce multiple horizontal clock signals in response to the horizontal flyback signal, wherein each multiple horizontal clock signal has a different phase with respect to one another. A phase selection circuit is configured to select one of the multiple horizontal clock signals such that an edge associated with the selected multiple horizontal clock signal is non-coincident with an edge associated with the vertical flyback signal. A blanking circuit is configured produce a blanking signal in response to the selected multiple horizontal clock signal such that the blanking signal determines the vertical position of the OSD image, whereby noise effects associated with at least one of the vertical flyback signal and the horizontal flyback signal are minimized.

Another embodiment of the invention is directed to a method for minimizing jitter in the vertical position of an on screen display (OSD) image associated with a display device having a display screen. The method includes: producing multiple horizontal clock signals that each have a different phase in response to a first horizontal timing signal and a second horizontal timing signal, wherein the first horizontal timing signal and the second horizontal timing signal are related, selecting one of the multiple horizontal clock signals such that the occurrence of an edge associated with the selected horizontal clock signal is non-coincident with an edge associated with a vertical flyback signal of the display device, and producing a vertical blanking signal in response to the selected horizontal clock signal wherein the vertical blanking signal triggers the display device to count a predetermined number of blank horizontal lines from the top of the display screen prior to generating the OSD image such that the predetermined number of blank horizontal lines corresponds to the vertical position of the OSD image on the display screen.

Yet another embodiment of the invention is directed to an apparatus, providing jitter reduction for an on screen display (OSD) window of a display device having a display screen. The apparatus includes means for generating horizontal timing signals configured to generate a first horizontal timing signal and a second horizontal timing signal, wherein the first horizontal timing signal and the second horizontal timing signal are related. A means for producing multiple horizontal clock signals is configured to produce multiple horizontal clock signals in response to the first horizontal timing signal and the second horizontal timing signal such that each of the multiple horizontal clock signals has a different phase. A means for selecting a multiple horizontal clock signal is configured to select one of the multiple horizontal clock signals such that the occurrence of an edge corresponding to the selected horizontal clock signal is non-coincident with an edge associated with the vertical flyback signal. A means for producing a vertical blanking signal is configured to produce a vertical blanking signal in response to the selected horizontal clock signal, wherein the vertical blanking signal triggers the display device to count a predetermined number of blank horizontal lines from the top of the display screen prior to generating the OSD image such that the predetermined number of blank horizontal lines corresponds to the vertical position of the OSD image on the display screen, whereby jitter in the vertical position of the OSD window is reduced.

A more complete appreciation of the present invention and its improvements can be obtained by reference to the accompanying drawings, which are briefly summarized below, to the following detail description of presently preferred embodiments of the invention, and to the appended claims.

BRIEF DESCRIPTION OF THE DRAWINGS

FIG. 8 shows a logic table for the combinational logic circuit associated with the phase selection circuit shown in FIG. 7;

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

The present invention is directed to an apparatus and method for a jitter reduction circuit that reduces the jitter in the vertical timing of an On Screen Display (OSD). An OSD, is generated using a number of signals generated for timing purposes. Two such signals are the horizontal rate signal and the vertical flyback signal. When the horizontal rate signal and the vertical flyback signal are aligned closely together in time, noise introduced in the generation of the signals can cause an error. The error is related to the number of blank lines counted from the top of a display screen before the OSD window is generated. The number of blank lines counted from the top of the display screen corresponds to the vertical position of the OSD window. The vertical position of the OSD window can experience a +/– one line count error due to noise. The vertical position of the OSD can move by one line count due to jitter. Unexpected movement of the OSD window is considered undesirable.

The present invention corrects for the jitter in the vertical position of the OSD window. Multiple horizontal rate signals are produced, each having a different phase. The line count error can be avoided by selecting one of the horizontal rate signals such that the phase of the selected horizontal rate signal is aligned separately from the vertical flyback signal. The present invention corrects for the jitter in the OSD window for both standard display formats and interlaced display formats.

Figure 1:
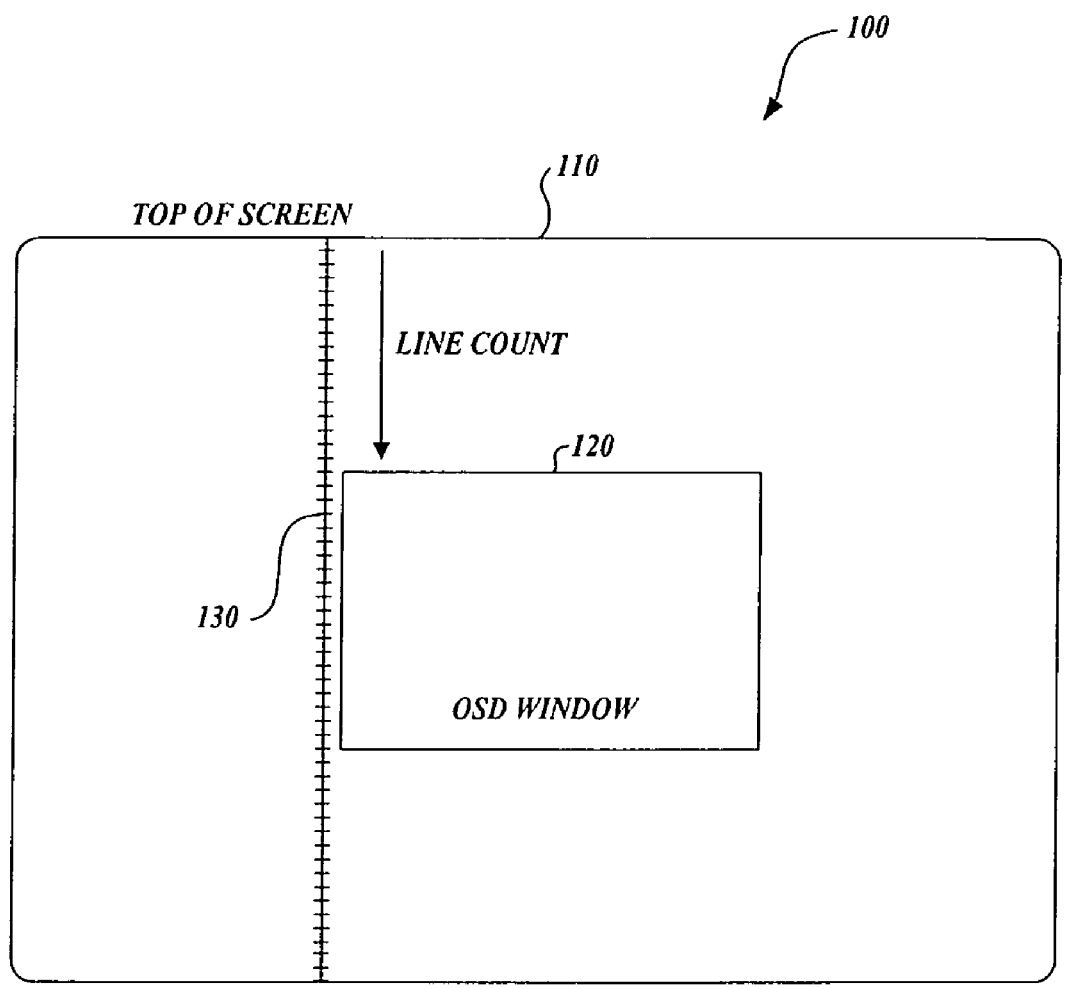
FIG. 1 illustrates a display screen with an associated OSD window.

FIG. 1 illustrates a display screen (110) with an associated OSD window (120). The dashed lines (130) on the left of the display are illustrative of horizontal lines on the display screen (110). A certain number of lines or line count from the top of the screen is blanked out before producing the OSD window (120). When jitter occurs in relation to an OSD, it is often due to a change in the line count C) from the top of the screen. Due to this line count error, the window jumps up and down by one line. This type of error is often referred to as a quantum +/– one line count error. The quantum +/– one line count error is manifested as jitter in the OSD window (120).

The +/– one line count error corresponds to noise that is associated with the vertical flyback signal of the display screen (110). The vertical flyback signal is derived from external analog sources. Analog signals are susceptible to noise. The noise can cause timing errors in the vertical flyback signal.

Figure 2:
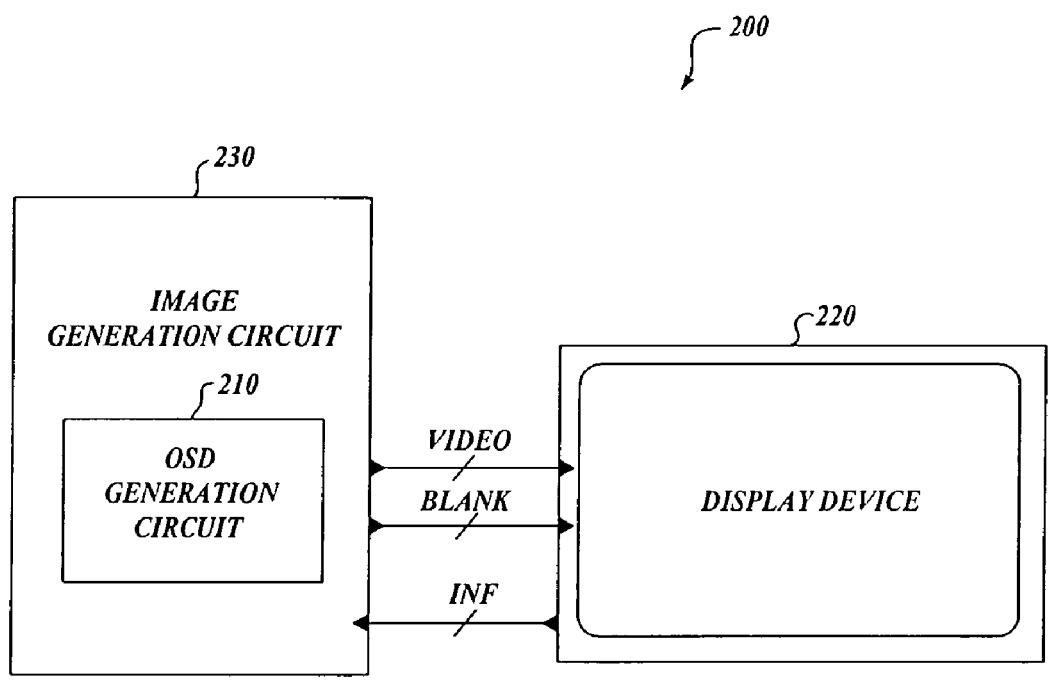
FIG. 2 shows an exemplary operating environment for producing a display.

FIG. 2 shows an exemplary operating environment for the present invention. The exemplary operating environment (200) includes an On Screen Display (OSD) generation circuit (210) and a display device (220). The OSD generation circuit (210) is part of an image generation circuit (230).

The OSD generation circuit (210) produces video signals (Video) and blanking signals (Blank) in response to information that is provided from the display device (220). The information from the display device (220) is illustrated as a display information signal (INF). The information from the display device (220) can include, but is not limited to, the resolution of the display, the refresh rate of the display, as well as other information. The display device (220) produces an image in response to the video signals (Video) and the blanking signals (Blank) produced by the image generation circuit (230). As mentioned previously, the OSD generation circuit (210) can be part of the image generation circuit (230). The OSD image is included with the video signals (Video) and the blanking signals (Blank) delivered to the display device (220). It is appreciated that the OSD generation circuit (210) as well as the image generation circuit (230) can be combined into the display device (220), or separated apart into distinct components.

In light of the above discussion, it is appreciated and understood that other signals and interoperability (not shown) may be present between the OSD generation circuit (220) and the display device (220), between the OSD generation circuit (210) and the image generation circuit (230), and between the image generation circuit (230) and the display device (220). The exemplary operating environment (200) illustrated in FIG. 2 is for the purpose of providing an example and should only be construed as an example operating environment for the present invention.

Figure 3:
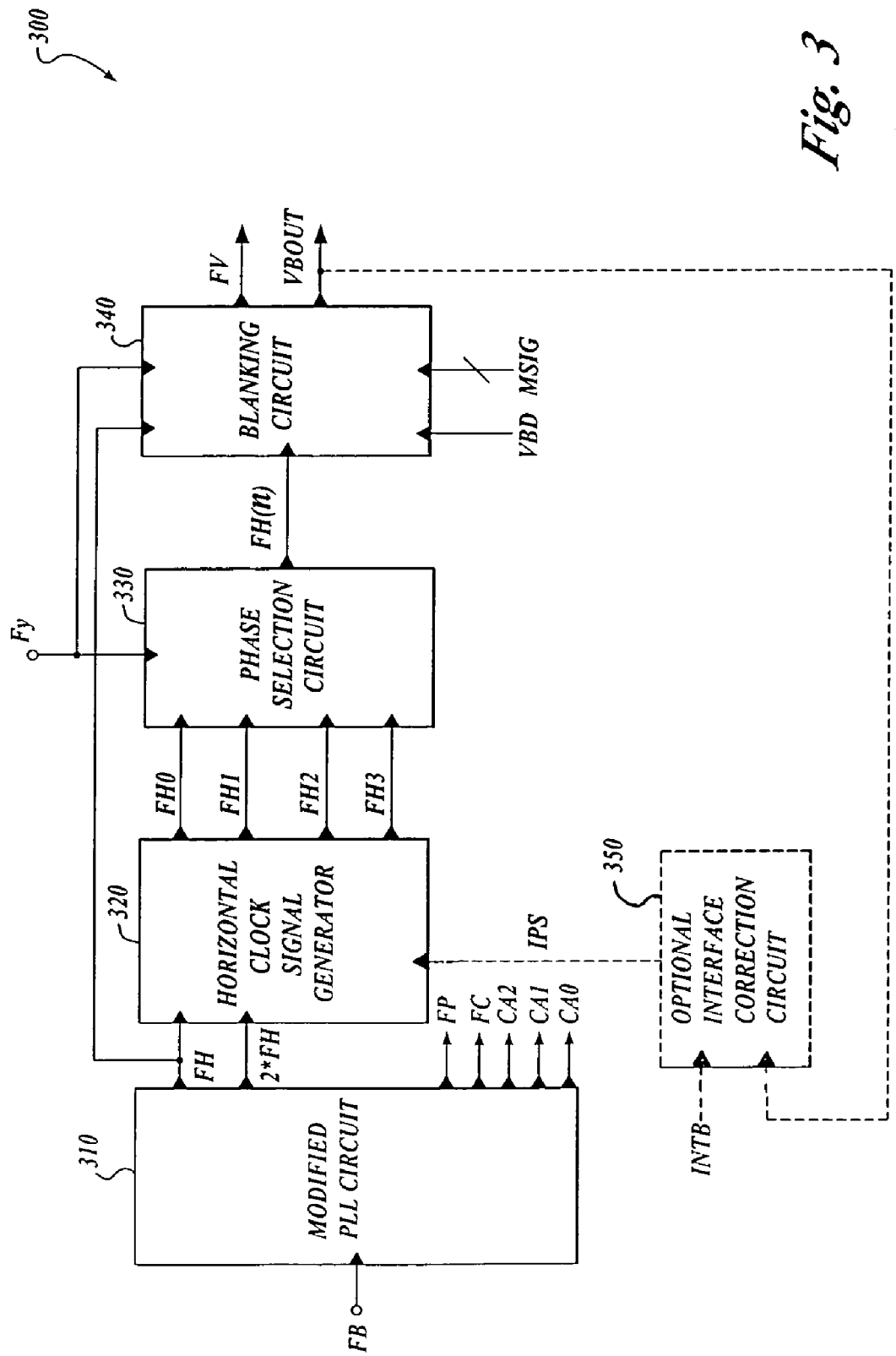
FIG. 3 illustrates a schematic diagram of a jitter reduction circuit integrated in a circuit for producing an OSD.

FIG. 3 illustrates a schematic diagram of a jitter reduction circuit integrated in a circuit for producing an OSD. The electronic circuit (300) includes a modified PLL circuit (310), a horizontal clock signal generator (320), a phase selection circuit (330), a blanking circuit (340), and an optional interlace correction circuit (350). The optional interlace correction circuit (350) can be included for display devices that can selectively operate in interlace mode.

Modified PLL circuit (310) produces a reference horizontal rate signal (FH) and a two-times horizontal rate signal (2*FH), in response to an externally generated horizontal flyback signal (FB). The modified PLL circuit also produces an OSD pixel signal (FP), an OSD character signal (FC), and character data signals (CA0–CA2). The horizontal clock signal generator (320) produces multiple horizontal clock signals (FH0–FH3) in response to the horizontal rate signal (FH) and the two-times horizontal rate signal (2*FH). Each of the horizontal clock signals (FH0–FH3) has a different phase. A phase selection circuit (330) produces a reference horizontal signal (FH(n)) in response to the horizontal clock signals (FH0–FH3) and a vertical flyback signal (Fy). A blanking circuit (340) produces a vertical rate signal (Fv) and a vertical blanking signal (VBOUT) in response to the reference horizontal signal (FH(n)) and other signals represented by a multi-signal input (MSIG). The other signals can include but are not limited to a vertical blank disable signal (VBD), a power save signal (PWRS), a blank video signal (BV), and horizontal blank signal (HBL) a power ground signal (PWRGD), as well as others. An optional interlace circuit (350) produces an interlace phase shift signal (IPS) in response to an interlace bit (INTB) and the vertical blanking signal (VBOUT).

The line count from the top of the display screen is synchronized by the vertical flyback signal (Fy). In previous applications, the vertical flyback signal (Fy) triggers the horizontal rate signal (FH) to initiate the line count. The line count is different depending on the alignment of the horizontal rate signal (FH) to the vertical flyback signal (Fy). If the horizontal rate signal (FH) occurs before the vertical flyback signal (Fy) the line count is one less line than if the horizontal rate signal (FH) occurs after the vertical flyback signal (Fy). The present invention identifies that noise on either the horizontal rate signal (FH) or vertical flyback signal (Fy) can cause a line count error when the occurrence of the rising edges of these two signals closely coincided with one another, resulting in jitter of the OSD.

For the present invention, a reference horizontal signal (FH(n)) is selected such that the rising edge of the reference horizontal signal (FH(n)) does not closely coincide with the rising edge of the vertical flyback signal (Fy). By using the reference horizontal signal (FH(n)), jitter in the vertical position of the OSD window (120) shown in FIG. 1 can be avoided.

Figure 4A:
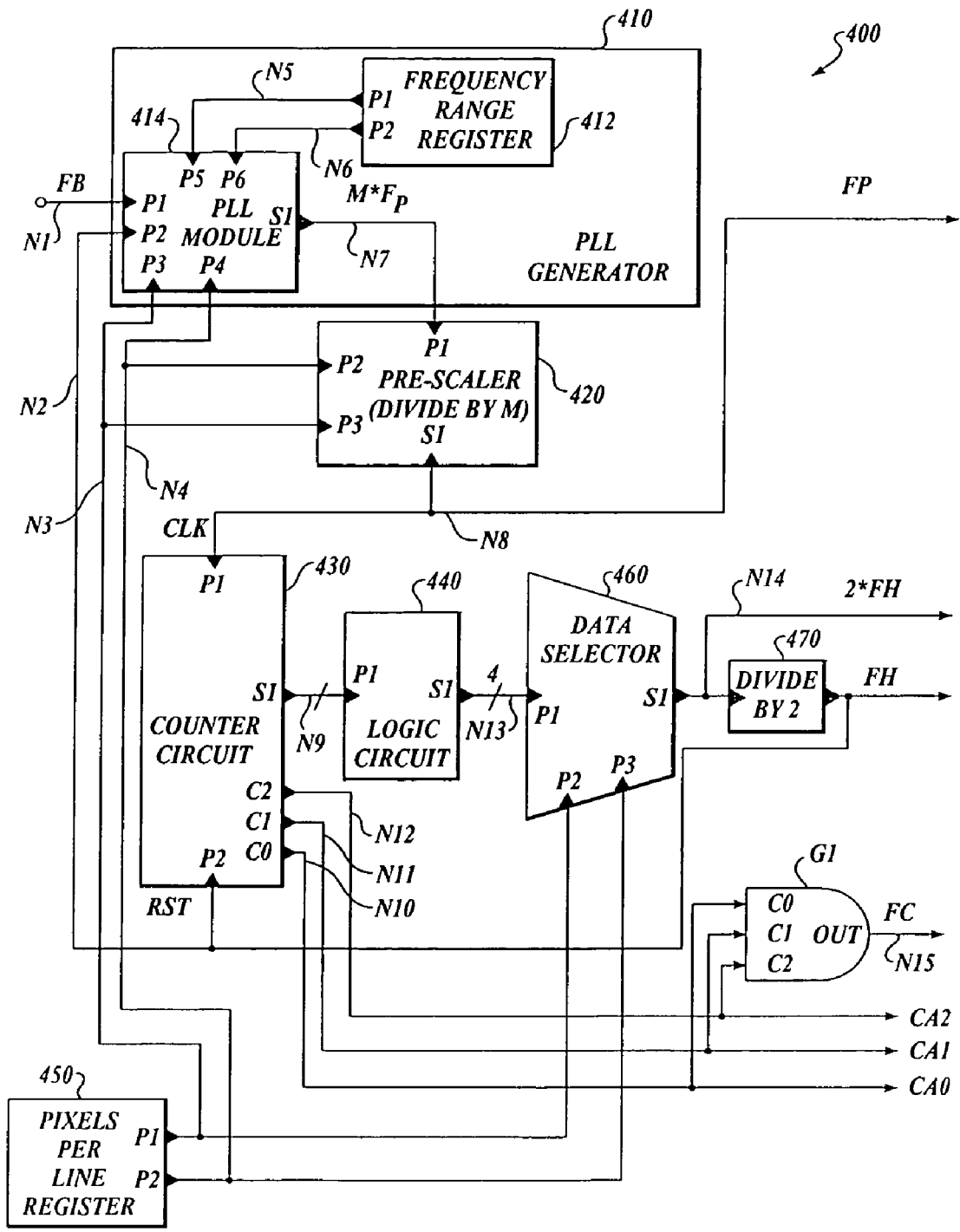
FIG. 4A shows a schematic diagram of a modified PLL circuit.

FIG. 4A shows a schematic diagram of an exemplary modified phase-locked loop (PLL) circuit. The modified PLL circuit (400) includes a phase-locked loop (PLL) generator (410), a pre-scaler (420), a counter circuit (430), a logic circuit (440), a pixels per line register (450), a data selector (460), a divide by two circuit (470), and a logic gate (G1). The phase-locked loop generator (410) includes a frequency range register (412), and a phase-locked loop module (414).

The phase-locked loop module (414) includes a first input (P1) that is coupled to node N1, a second input (P2) that is coupled to node N2, a third input (P3) that is coupled to node N3, a fourth input (P4) coupled to node N4, a fifth input (P5) that is coupled to node N5, a sixth input (P6) that is coupled to node N6, and an output (P7) that is coupled to node N7. The frequency range register (412) includes a first output (P1) that is coupled to node N5, and a second output (P2) that is coupled to node N6. The pre-scaler (420) includes a first input (P1) that is coupled to node N7, a second input (P2) that is coupled to node N4, a third input (P3) that is coupled to node N3, and an output (S1) that is coupled to node N8. The counter circuit (430) includes a first input (P1) that is coupled to node N8, a second input (P2) that is coupled to node N2, a first output (S1) that is coupled to node N9, a second output (C0) that is coupled to node N10, a third output (C1) that is coupled to node N11, and a fourth output (C2) that is coupled to node N12. The logic circuit (440) includes a first input (P1) that is coupled to node N9 and an output (S1) that is coupled to node N13. The pixels per line register (450) includes a first output (P1) that is coupled to node N3, and a second output (P2) that is coupled to node N4. The data selector (460) includes a first input (P1) that is coupled to node N13, a second input (P2) that is coupled to node N3, a third input (P3) that is coupled to node N4, and an output (P4) that is coupled to node N14. The divide by two circuit (470), has an input (P1) that is coupled to node N14, and an output (P2) that is coupled to node N2. The logic gate (G1) has a first input (C0) that is coupled to node N10, a second input (C1) that is coupled to node N11, a third input (C2) that is coupled to node N12, and an output (OUT) that is coupled to node N15.

The modified PLL circuit (400) produces the horizontal timing signals and the character generation signals for producing the OSD window. The phase locked loop module (414) produces an un-scaled OSD pixel signal (M*FP) in response to the horizontal flyback signal (FB), the horizontal rate signal (FH), the bit outputs of the frequency range register (412) and the bit outputs of the pixels per line register (420). The levels of the bit outputs of the frequency range register (412) and the pixels per line register (450) depend on the resolution and refresh rate of the display device (220) shown in FIG. 2. The pre-scaler (420) produces the OSD pixel signal (FP) in response to the un-scaled OSD pixel signal (M*FP) and the bit outputs of the pixels per line register (420). The pre-scaler (420) scales the OSD pixel (FP) signal by a divide ratio M. The OSD pixel signal (FP) is used as the timing signal for displaying the characters in the OSD window shown in FIG. 1. Typically, the OSD pixel signal (FP) has a frequency that is 300 or 400 times the frequency of the horizontal flyback signal (FB).

The horizontal flyback signal (FB) corresponds to the master horizontal retrace sync signal from the display device. The counter circuit (430) increments its count when triggered by the OSD pixel signal (FP). The counter circuit (430) is reset by the horizontal rate signal (FH). Three bits of the counter circuit are used as character data signals (CA0–CA2) for producing the characters in the OSD window. The character data signals (CA0–CA2) are combined by the logic gate (G1) to produce the OSD character signal (FC). The ODS character signal (FC) is utilized as an additional C3 timing signal for producing the characters. The logic circuit (440) produces four clock signals in response to the output (S1) of the counter circuit (430). The logic circuit (440) is shown in greater detail in FIG. 4B described below. The data selector (460) produces a two-times horizontal rate signal (2*FH) in response to the clock signals and the bit outputs (P1, P2) of the pixels per line register (450). The two-times horizontal rate signal (2*FH) is divided by the divide by two circuit (470) to produce the horizontal rate signal (FH). The two-times horizontal rate signal (2*FH) is a scaled signal of the horizontal rate signal (FH), with a frequency that is double the horizontal rate signal (FH). The two-times horizontal rate signal (2*FH) and the horizontal rate signal (FH) are used by the horizontal clock signal generator (320) shown in FIG. 3 to produce the horizontal clock signals (FH0–FH3).

From the above discussion, it can be appreciated that a PLL circuit other than the modified PLL circuit (400) shown in FIG. 4A can be used to achieve similar results. For the purpose of the present invention, a PLL circuit capable of producing the horizontal rate signal (FH) and the two-times horizontal rate signal (2*FH) may be used. Also, the two-times horizontal rate signal (2*FH) can be a multiple other than double the frequency of the horizontal rate signal (FH). It is also appreciated that the logic circuit (440) is not limited to producing four clock signals. Similar results may be achieved by producing a fewer or greater number of clock signals at the output of the logic circuit (440).

Figure 4B:
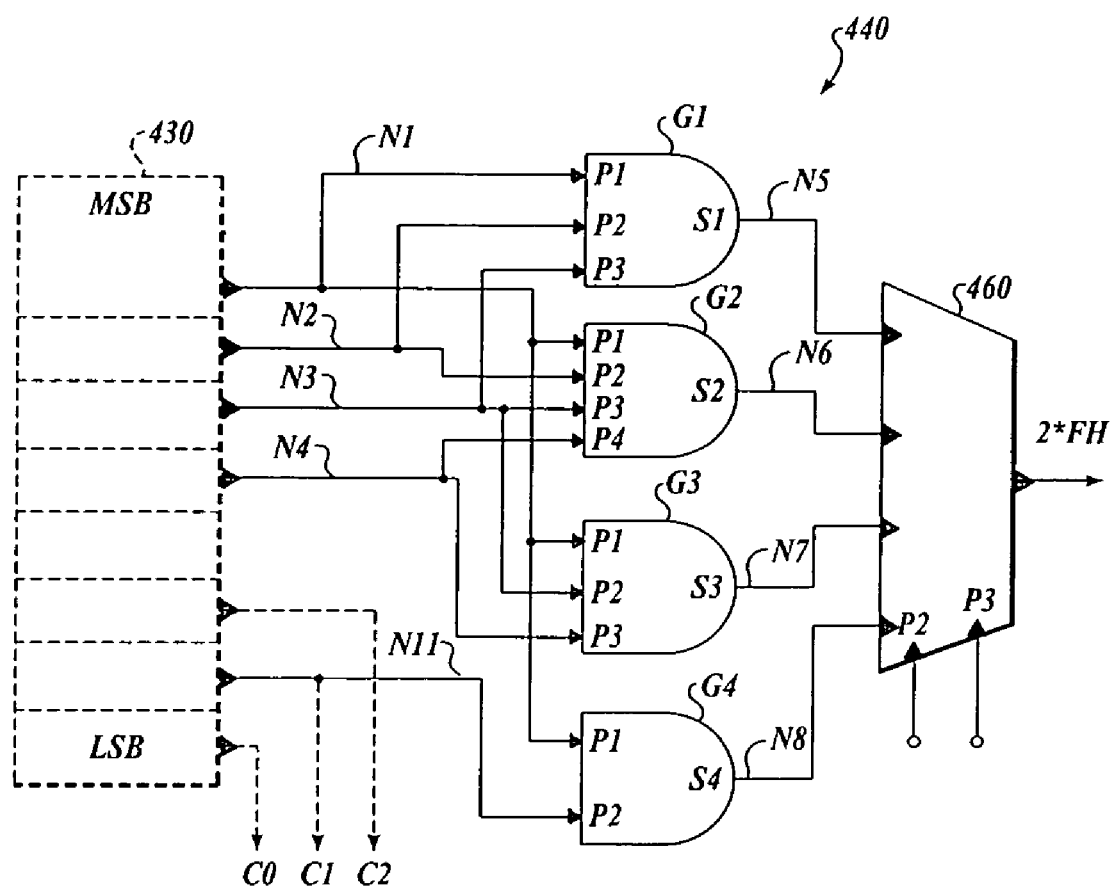
FIG. 4B illustrates the logic circuit associated with the modified PLL circuit shown in FIG. 4A.

FIG. 4B illustrates an exemplary logic circuit for use in the modified PLL circuit (400) shown in FIG. 4A. The exemplary logic circuit (440) includes four logic gates (G1–G4). The counter circuit (430) and the data selector (460) of the modified PLL circuit shown in FIG. 4A are also shown for reference of the connections of the logic circuit (440).

The first logic gate (G1) is an AND gate that includes a first input (P1) that is coupled to node N1, a second input (P2) that is coupled to node N2, a third input (P3) that is coupled to node N3, and an output (S1) that is coupled to node N5. The second logic gate (G2) is an AND gate that includes a first input (P1) that is coupled to node N1, a second input (P2) that is coupled to node N2, a third input (P3) that is coupled to node N3, a fourth input (P4) that is coupled to node N4, and an output (S2) that is coupled to node N6. The third logic gate (G3) is an AND gate that includes a first input (P1) that is coupled to node N1, a second input (P2) that is coupled to node N3, a third input (P3) that is coupled to node N4, and an output (S3) that is coupled to node N7. The fourth logic gate (G4) is an AND gate that includes a first input (P1) that is coupled to node N1, a second input (P2) that is coupled to node N11, and an output (S4) that is coupled to node N8.

The exemplary logic circuit (440) converts the signals from the counter circuit (430) into the clock outputs (S1–S4) of the logic gates (G1–G4). Each logic level produced at the outputs (S1–S4) of each logic gate (G1–G4) is coupled to the data selector (460). The output of the counter circuit (430) is a series of bit signals. Logic gates G1–G4 are arranged to produce four clock signals from the counter circuit (430) bit signals. As shown in FIG. 4B, the clock signals each correspond to a predetermined count. The counter may be implemented in other ways, including but not limited to, a register with a preload count, a microprocessor or controller, or any other electronic circuit that is arranged to operate as a counter. Also, the wiring of the logic gates (G1–G4) may be rearranged as may be desired.

Figure 5:
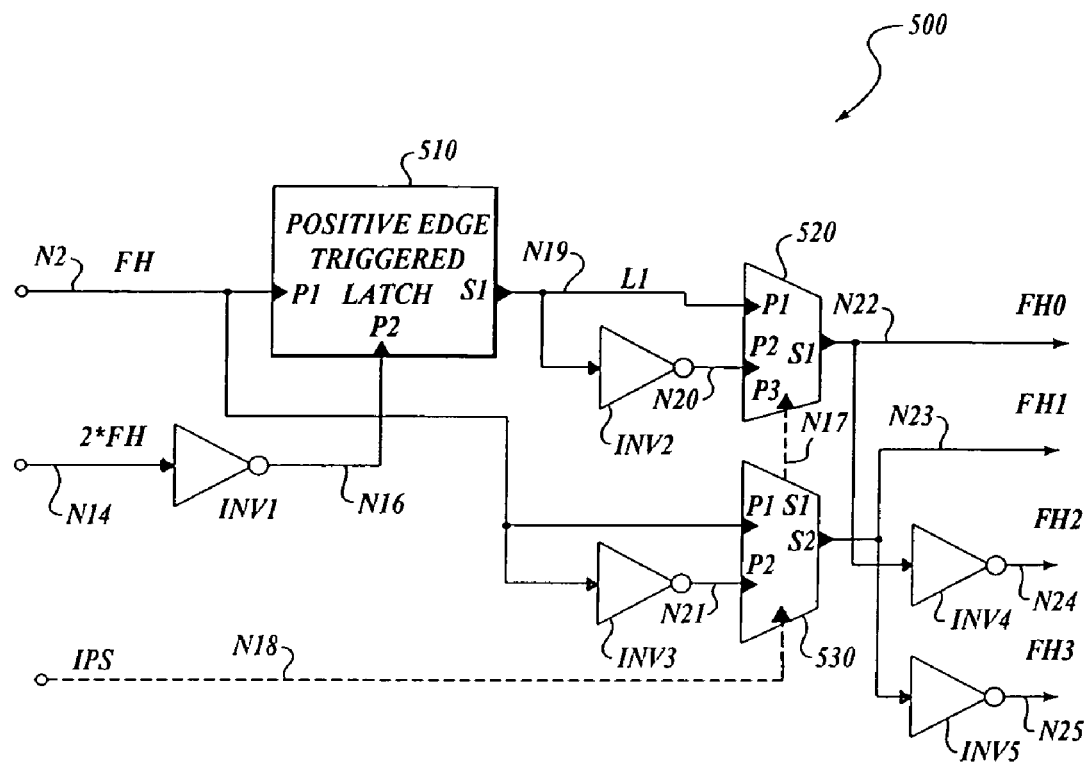
FIG. 5 illustrates a schematic diagram of a horizontal clock signal generator and its associated timing diagram.
Figure 5:
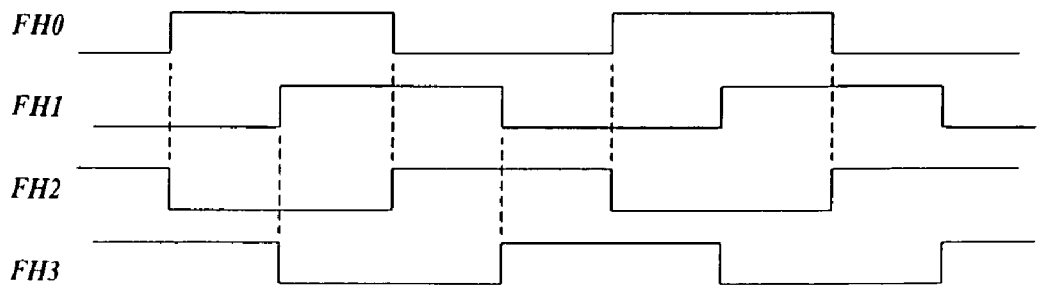

FIG. 5 illustrates a schematic diagram of an exemplary horizontal clock signal generator in accordance with the present invention and its associated timing diagram. The horizontal clock signal generator (500) includes a positive edge triggered latch (510), two optional data selectors (520, 530), and five inverter circuits (INV1–INV5).

The positive edge triggered latch (510) includes a first input (P1) that is coupled to node N2, a second input (P2) that is coupled to node N16, and an output (S1) that is coupled to node N19. The first inverter (INV1) is coupled between node N14 and node N16. The second inverter (INV2) is coupled between node N19 and node N20. The third inverter (INV3) is coupled between node N2 and node N21. The first data selector (520) includes a first input (P1) that is coupled to node N19, a second input (P2) that is coupled to node N20, a third input (P3) that is optionally coupled to node N17, and an output (S1) that is coupled to node N22. The second data selector (530) includes a first input (P1) that is coupled to node N2, a second input (P2) that is coupled to node N21, a third input (P3) that is optionally coupled to node N18, a first output (S1) that is optionally coupled to node N17, and a second output (S2) that is coupled to node N23. The fourth inverter (INV4) is coupled between node N22 and node N24. The fifth inverter (INV5) is coupled between node N23 and node N25.

The inverter circuit (INV1) produces an inverted two-times horizontal rate signal in response to the two-tines horizontal rate signal (2*FH). The positive edge triggered latch (510) is triggered by the inverted two-times horizontal rate signal. When triggered, the positive edge triggered latch (510) produces an output signal (L1) that follows the horizontal rate signal (FH). The output signal (L1) is inverted by inverter circuit INV2. The horizontal rate signal (FH) is inverted by inverter circuit INV3. The first and second optional data selectors (520, 530) as well as inverter circuits INV2 and INV3, are used to implement the interlace display mode as described below.

The first optional data selector (520) produces a first horizontal clock signal (FH0) in response to the output signal (L1), the inverted output signal, and an optional interlace phase shift (IPS) signal. The second optional data selector (530) produces a second horizontal clock signal (FH1) in response to the horizontal signal (FH), the inverted horizontal rate signal, and the optional interlace phase shift signal (IPS). A third phase horizontal rate signal (FH2) is produced by inverting the first horizontal clock signal (FH0) using inverter circuit (INV4). A fourth horizontal clock signal (FH3) is produced by inverting the second horizontal clock signal (FH1) using inverter circuit (INV5). The four horizontal clock signals (FH0–FH3) are subsequently used by the phase selection circuit (330) shown in FIG. 3.

It is appreciated and understood in light of the above discussion that the present invention may be configured to use a latch other than the positive edge triggered latch shown.

The optional interlace phase shift signal (IPS) can be used by the horizontal clock signal generator (500) to correct for an interlace mode. The optional interlace phase shift signal (IPS) is used by the data selectors (520, 530) to change the phase of the four horizontal clock signals (FH0–FH3) by 180 degrees. This 180 degree phase shift in the horizontal clock signals (FH0–FH1) matches the 50% shift in the duty cycle between the vertical frame periods when the display is in interlace mode. By matching the shift between the each vertical frame period, the interlace phase shift signal (IPS)

compensates for any error in generating the OSD window caused by interlace mode. The generation of the interlace phase shift signal (IPS) is discussed in greater detail below with reference to FIGS. 13–15.

The timing diagram included in FIG. 5 illustrates the relationships between the horizontal clock signals (FH0–FH3). Each horizontal clock signal (FH0–FH3) is shifted 90 degrees from the previous signal respectively. The 90 degree phase shift is illustrated by a one-quarter shift in the period of the horizontal clock signals (FH0–FH3). For example, the horizontal clock signal FH1 is shifted by one-quarter in comparison to horizontal clock signal FH0. The shifts in phase for the horizontal rate signal (FH) provide temporal hysteresis, or a temporary delay in the occurrence of the rising edge of the horizontal rate signal (FH). The amount of temporal hysteresis provided by each horizontal clock signal (FH0–FH3) is different. The horizontal clock signals (FH0–FH3) are related to one another with each having a temporal hysteresis that is one-quarter period apart respectively. It can also be seen from the timing diagram that the third horizontal clock signal (FH2) is the inverse of the first horizontal clock signal (FH0), and the fourth horizontal clock signal (FH3) is the inverse of the second horizontal clock signal (FH1).

In light of this disclosure, it is appreciated and understood that the horizontal clock signal generator (500) can be configured to produce more than four horizontal clock signals (FH0–FH3). For example, the horizontal clock signal generator (500) can be configured to produce eight horizontal clock signals. Each of the eight horizontal clock signals has a different phase. With eight horizontal clock signals, the horizontal clock signals (FH0–FH3) are separated by 45 degrees between adjacent phases. This translates into a delay or temporal hysteresis corresponding to one-eighth of the period of the horizontal clock signals. The delay between each horizontal clock signal is therefore smaller for eight horizontal clock signals than for four horizontal clock signals, however the overall operation of the jitter reduction circuit (300) remains similar for each configuration.

Figure 6:
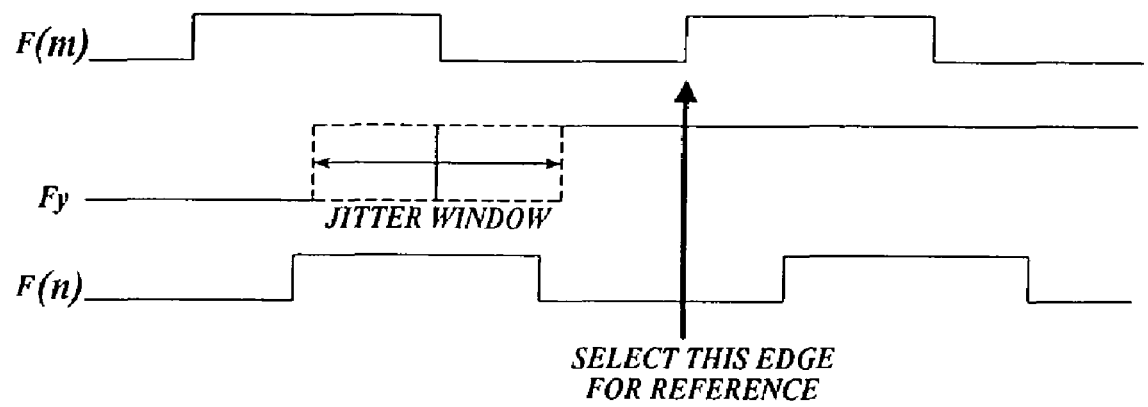
FIG. 6 shows an exemplary timing diagram illustrating the jitter window associated with producing an OSD.

FIG. 6 shows an exemplary timing diagram illustrating the jitter window associated with producing an OSD. The jitter window corresponds to a range of time that is centered on the vertical flyback signal (Fy). The OSD image has a higher probability of jittering when the rising edge of the vertical flyback signal (Fy) is aligned with the horizontal clock signal (e.g., F(n)) selected for reference. The jitter window illustrated has a range that is one-half the period of the horizontal clock signal (e.g., F(n)) selected for reference. To avoid the jitter, a horizontal clock signal (e.g., F(m)) with a rising edge occurring outside the jitter window is selected. It may be that the original horizontal clock signal has a rising edge outside of the jitter window. In this case, a new horizontal clock signal may not need to be selected. However, a new reference edge may be selected to ensure that the edge occurs outside the jitter window. Of the two exemplary horizontal clock signals (F(m), F(n)) illustrated, F(n) is the horizontal clock signal occurring most coincident with the vertical flyback signal (Fy). In this embodiment, the first rising edge following the vertical flyback signal (Fy) that is considered least coincident with the vertical flyback signal (Fy) is selected as the reference for the horizontal signal. The rising edge of the selected signal corresponds to the exemplary horizontal clock signal (F(m)). Jitter can be avoided by selecting a horizontal clock signal (e.g., F(m)) with a rising edge occurring outside of the jitter window.

Figure 7:
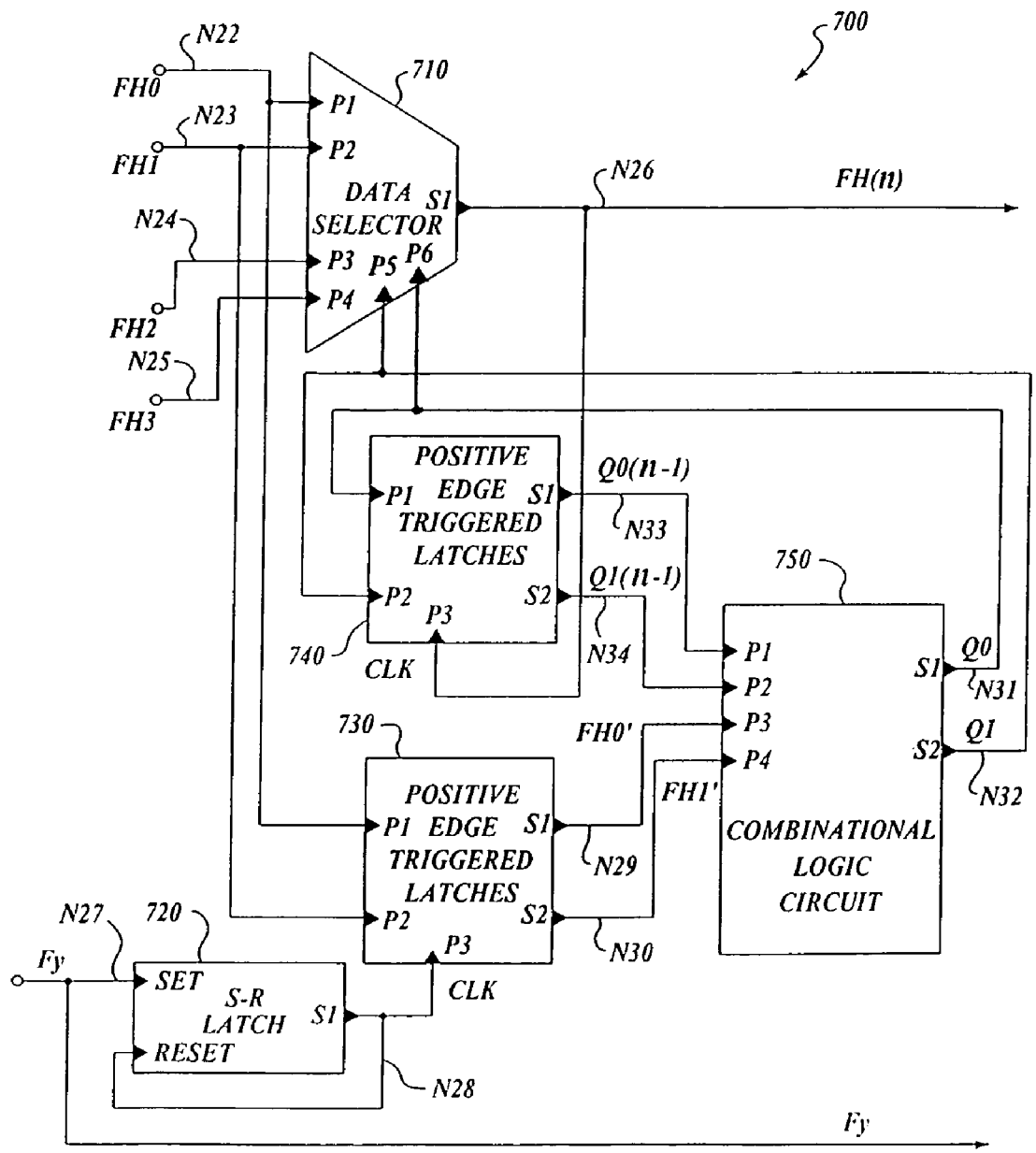
FIG. 7 illustrates a schematic diagram of a phase selection circuit.

FIG. 7 illustrates a schematic diagram of a phase selection circuit. The phase selection circuit (700) includes the data selector (710), an S-R latch (720), two pairs of positive edge triggered latches (730, 740), and a combinational logic circuit (750).

The data selector (710) includes a first input (P1) that is coupled to node N22, a second input (P2) that is coupled to node N23, a third input (P3) that is coupled to node N24, a fourth input (P4) that is coupled to node N25, a fifth input (P5) that is coupled to node N32, an sixth input (P6) that is coupled to node N31, and an output (S1) that is coupled to node N26. The S-R latch (720) includes a first input (Set) that is coupled to node N27, a second input (Reset) that is coupled to node N28, and an output (S1) that is coupled to node N28. The first pair of positive edge triggered latches (730) include a first input (P1) that is coupled to node N22, a second input (P2) that is coupled to node N23, a third input (P3) that is coupled to node N28, a first output (S1) that is coupled to node N29, and a second output (S2) that is coupled to node N30. The second pair of positive edge triggered latches (740) includes an input (P1) that is coupled to node N31, a second input (P2) that is coupled to node N32, a third input (P3) that is coupled to node N26, a first output (S1) that is coupled to node N33, and a second output (S2) that is coupled to node N34. The combinational logic circuit (750) includes a first input (P1) that is coupled to node N33, a second input (P2) that is coupled to node N34, a third input (P3) that is coupled to node N29, a fourth input (P4) that is coupled to node N30, a first output (S1) that is coupled to node N31, and a second output (S2) that is coupled to node N32.

The reference horizontal signal (FH(n)) is selected by the data selector (710) from one of the four horizontal clock signals (FH0–FH3). The data selector (710) makes the selection in response to the logic outputs (Q0, Q1) of the combinational logic circuit (750). The S-R latch (720) produces the clocking signal (CLK) when it is set by the vertical flyback signal (Fy). The S-R latch (720) is subsequently reset by the same clocking signal (CLK). Thus, the S-R latch (720) produces a pulse in response to the vertical flyback signal (Fy). The first pair of positive edge triggered latches (730) store the current logic levels of horizontal clock signals FH0 and FH1 when triggered by the clocking signal (CLK). The logic outputs (FH0', FH1') of the first pair of positive edge triggered latches (730) are coupled to the combinational logic circuit (750).

A second pair of positive edge triggered latches (740) is triggered by the reference horizontal signal (FH(n)) and stores the logic outputs (Q0, Q1) of the combinational logic circuit (750). The logic outputs (Q0(n−1), Q1(n−1)) of the second pair of positive edge triggered latches (740) are coupled to the combinational logic circuit (750). Q0(n−1) and Q1(n−1) correspond to the outputs of the combinational logic circuit (750) for the previous instance of the vertical flyback signal (Fy).

The combinational logic circuit (750) produces the two outputs (Q0, Q1) in response to signals FH0', FH1', Q0(n−1), and Q1(n−1). The combinational logic circuit (750) includes logic that is arranged to make a decision to keep Q0 and Q1 the same as the previous instance of the vertical flyback signal (Fy), or to change Q0 and Q1. The source of the reference horizontal signal (FH(n)) is selected from one of the horizontal clock signals (FH0–FH3) in response to Q0 and Q1.

From the previous discussion, it is appreciated and understood that the phase selection circuit (700) can be reconfigured for any number of additional phases. In the eight phase example mentioned previously, the phase selection circuit (700) can be reconfigured with an additional positive edge triggered latch for each pair of positive edge triggered latches (730, 740). The combinational logic circuit (750) would then include six logic inputs and three logic outputs to accommodate for the additional phases.

FIG. 8 shows a logic table for the combinational logic circuit (750) shown in FIG. 7. The logic table lists the logic levels produced by the outputs (Q0, Q1) of the combinational logic circuit (750) in response to the logic levels of signals Q0(n−1), Q1(n−1), FH1', and FH0'. The source of the reference horizontal signal (FH(n)) is selected from the horizontal clock signals (FH0–FH3) based upon the logic table of FIG. 8. The data selector (710) shown in FIG. 7 selects the first horizontal clock signal (FH0) as the source of the reference horizontal signal (FH(n)) when Q0=0 and Q1=0. Correspondingly, the second horizontal clock signal (FH1) is selected when Q0=0 and Q1=1, the third horizontal clock signal (FH2) is selected when Q0=1 and Q1=0, and the fourth horizontal clock signal (FH3) is selected when Q0=1 and Q1=1. Selecting the horizontal clock signal (FH0–FH3) according to the relationship given in the logic table shown in FIG. 8, results in a reference horizontal signal (FH(n)) that has a reference edge outside the jitter window shown in FIG. 6. It is appreciated and understood that the combinational logic circuit (750) may be arranged such that the source of the reference horizontal signal (FH(n)) is chosen according to other logic levels of Q0 and Q1.

Figure 9:
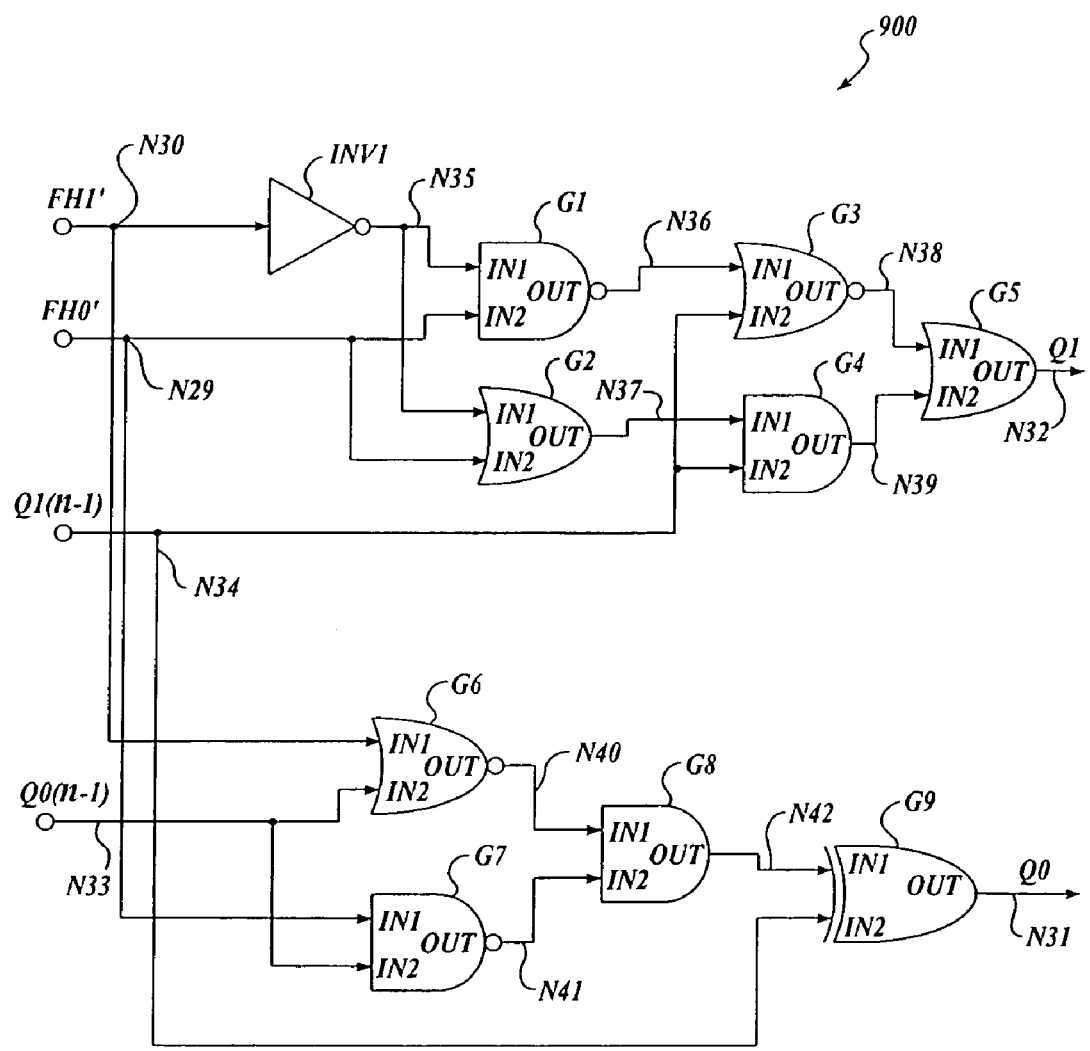
FIG. 9 illustrates an exemplary schematic diagram of a logic circuit for implementing the logic table shown in FIG. 8.

FIG. 9 illustrates an exemplary schematic diagram of a possible configuration for the combinational logic circuit (750) shown in FIG. 7 that can achieve the relationship given in the logic table shown in FIG. 8. This exemplary combinational logic circuit (900) includes an inverter (INV1) and logic gate (G1–G5, G10–G13).

The inverter circuit (INV1) is coupled between node N30 and node N35. The first logic gate (G1) is a NAND gate that includes a first input (IN1) that is coupled to node N35, a second input (IN2) that is coupled to node N29, and an output (OUT) that is coupled to node N36. The second logic gate (G2) is an OR gate that includes a first input (IN1) coupled to node N35, a second input (IN2) that is coupled to node N29, and an output (OUT) that is coupled to node N37. The third logic gate (G3) is a NOR gate that includes a first input (IN1) that is coupled to node N36, a second input (IN2) that is coupled to node N34, and an output (OUT) that is coupled to node N38. The fourth logic gate (G4) is an AND gate that includes a first input (IN1) that is coupled to node 37, a second input (IN2) that is coupled to node N34, and an output (OUT) that is coupled to node N39. The fifth logic gate (G5) is an OR gate that includes a first input (IN1) that is coupled to node N38, a second input (IN2) that is coupled to node N39, and an output (OUT) that is coupled to node N32. The sixth logic gate (G6) is a NOR logic gate that includes a first input (IN1) that is coupled to node N30, a second input (IN2) that is coupled to node N33, and an output (OUT) that is coupled to node N40. The seventh logic gate (G7) is a NAND gate that includes a first input (IN1) that is coupled to node N29, a second input (IN2) that is coupled to node N33, and an output (OUT) that is coupled to node N41. The eighth logic gate (G8) is an AND gate that includes a first input (IN1) that is coupled to node N40, a second input (IN2) that is coupled to node N41, and an output (OUT) that is coupled to node N42. The ninth logic gate (G9) is an XOR gate that includes a first input (IN1) that is coupled to node N42, a second input (IN2) that is coupled to node N34, and an output (OUT) that is coupled to node N31.

In light of the previous discussion, it is appreciated and understood that a logic circuit other than the exemplary combinational logic circuit (900) shown in FIG. 9 can be used to achieve the relationship of the logic table shown in FIG. 8.

Figure 10:
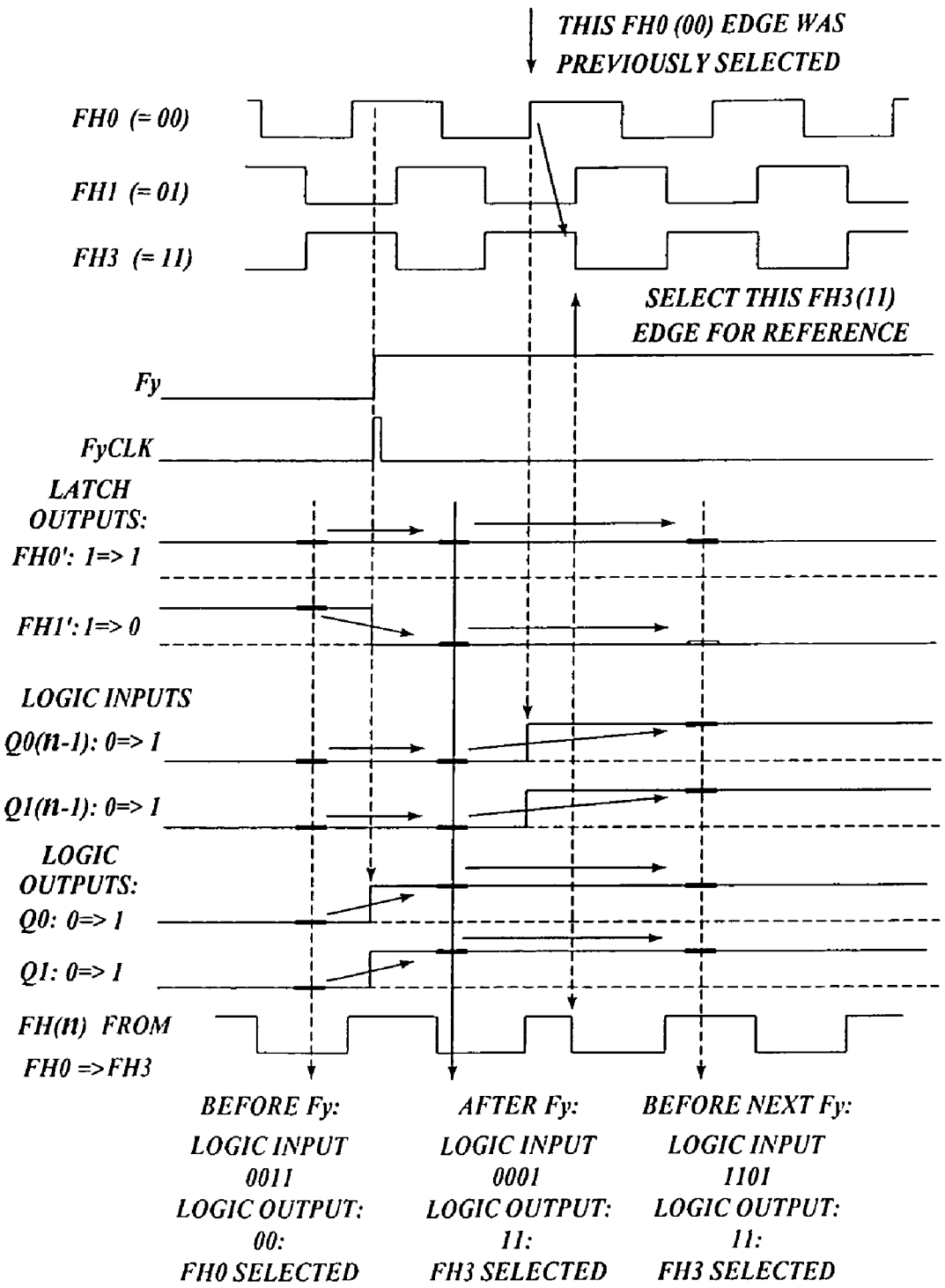
FIG. 10 shows an exemplary timing diagram for the signals of the phase selection circuit shown in FIG. 7.

FIG. 10 shows an exemplary timing diagram for the phase selection circuit (700) shown in FIG. 7. The timing diagram of FIG. 10 illustrates an example of the resulting timing signals for a single instance of the vertical flyback signal (Fy). In this example, FH0 is initially selected as the source of the reference horizontal signal (FH(n)) for the previous instance of the vertical flyback signal (Fy). Also, this instance of the vertical flyback signal (Fy) closely coincides with the rising edge of FH0. Before the occurrence of the vertical flyback signal (Fy), the input signals (Q0(n−1), Q1(n−1), FH1', FH0') to the combinational logic circuit (750) shown in FIG. 7 have logic levels 0, 0, 1, 1 respectively. The S-R latch (720) generates the clocking signal (CLK), as shown in FIG. 10, in response the vertical flyback signal (Fy). The clocking signal (CLK) triggers the first pair of positive edge triggered latches (730). As shown in the timing diagram, the logic levels of FH0 and FH1 at that instance are 1 and 0 respectively. The 1 and 0 logic levels for FH0 and FH1 change the input signals (Q0(n−1), Q1(n−1), FH1, FH0) of the combinational logic circuit (750) to logic levels of 0, 0, 0, 1 respectively. These logic levels for the input signals (Q0(n−1), Q1(n−1), FH0, FH1) result in logic levels of 1, 1 for the logic outputs (Q0, Q1) of the combinational logic circuit (750). According to the logic table shown in FIG. 8, FH3 is selected as the source of the reference horizontal signal (FH(n)). The second pair of positive edge triggered latches (740) is triggered when the next positive edge of the reference horizontal signal (FH(n)) occurs following the occurrence of the vertical flyback signal (Fy). The second pair of positive edge triggered latches (740) are arranged to latch the current logic levels for the logic outputs (Q0, Q1) of the combinational logic circuit (750). This again changes the logic levels of the input signals (Q0(n−1), Q1(n−1), FH1, FH0) of the combinational logic circuit (750) to logic levels of 1, 1, 0, 1 respectively. According to the logic table shown FIG. 8, this does not change the logic outputs (Q0, Q1) of the combinational logic circuit (750). Therefore, FH3 remains selected as the source of the reference horizontal signal (FH(n)) until the next instance of the vertical flyback signal (Fy).

FIGS. 11A–11D illustrate exemplary timing diagrams for the selection of the source of the reference horizontal signal (FH(n)) of the phase selection circuit (700) in FIG. 7. FIGS. 11A–11D illustrate an example of possible transitions of the source of the reference horizontal signal (FH(n)). The transitions in this example depend on when the vertical flyback signal (Fy) occurs in relation to the reference edge of the previously chosen horizontal clock signal. The previously chosen horizontal clock signal in this example is FH1.

Figure 11A:
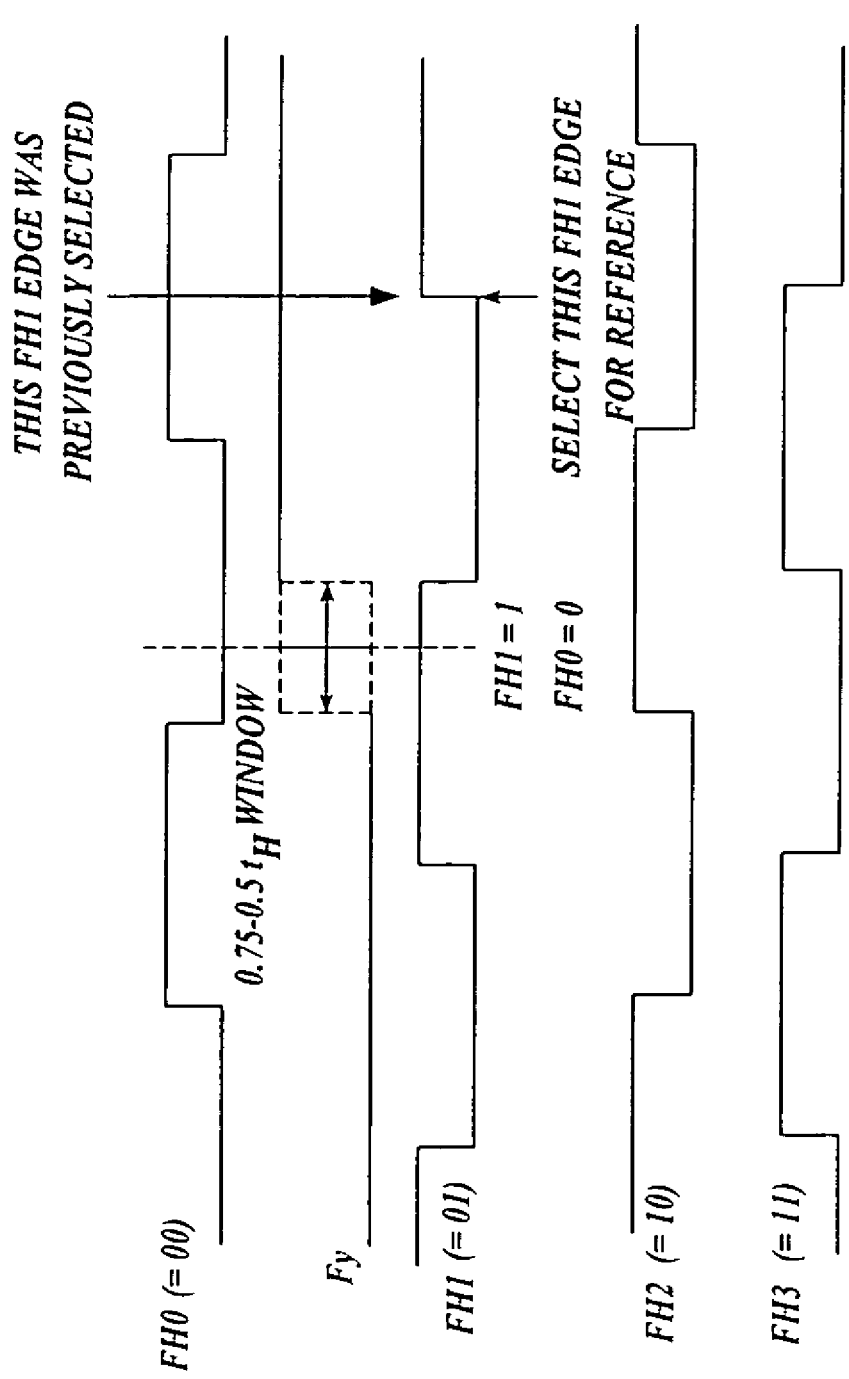
FIGS. 11A–11D illustrate exemplary timing diagrams of the source for the reference horizontal clock signal shown in FIG. 7.

In FIG. 11A, the vertical flyback signal (Fy) occurs within a 0.75–05 $t_H$ window with respect to the previously selected reference edge. The 0.75–0.5 tH window corresponds to a window that is one-half to three-quarters of a period ($t_H$) distant from the previously selected reference edge. The period ($t_H$) corresponds to the period of the horizontal clock signals (FH0–FH1) as well as the period of the horizontal rate signal (FH). The rising edge of the vertical flyback signal (Fy) is centered in the 0.75–05 $t_H$ window, and is not relatively coincident, or non-coincident, with the previously selected reference edge. As the vertical flyback signal (Fy) and the selected reference edge are not relatively coincident with one another, the risk of jitter occurring in the vertical position of the OSD window is minimized. Therefore, the phase selection circuit (700) keeps FH1 as the source of the reference horizontal signal (FH(n)) such that the same rising edge of FH1 remains the selected reference edge.

Figure 11B:
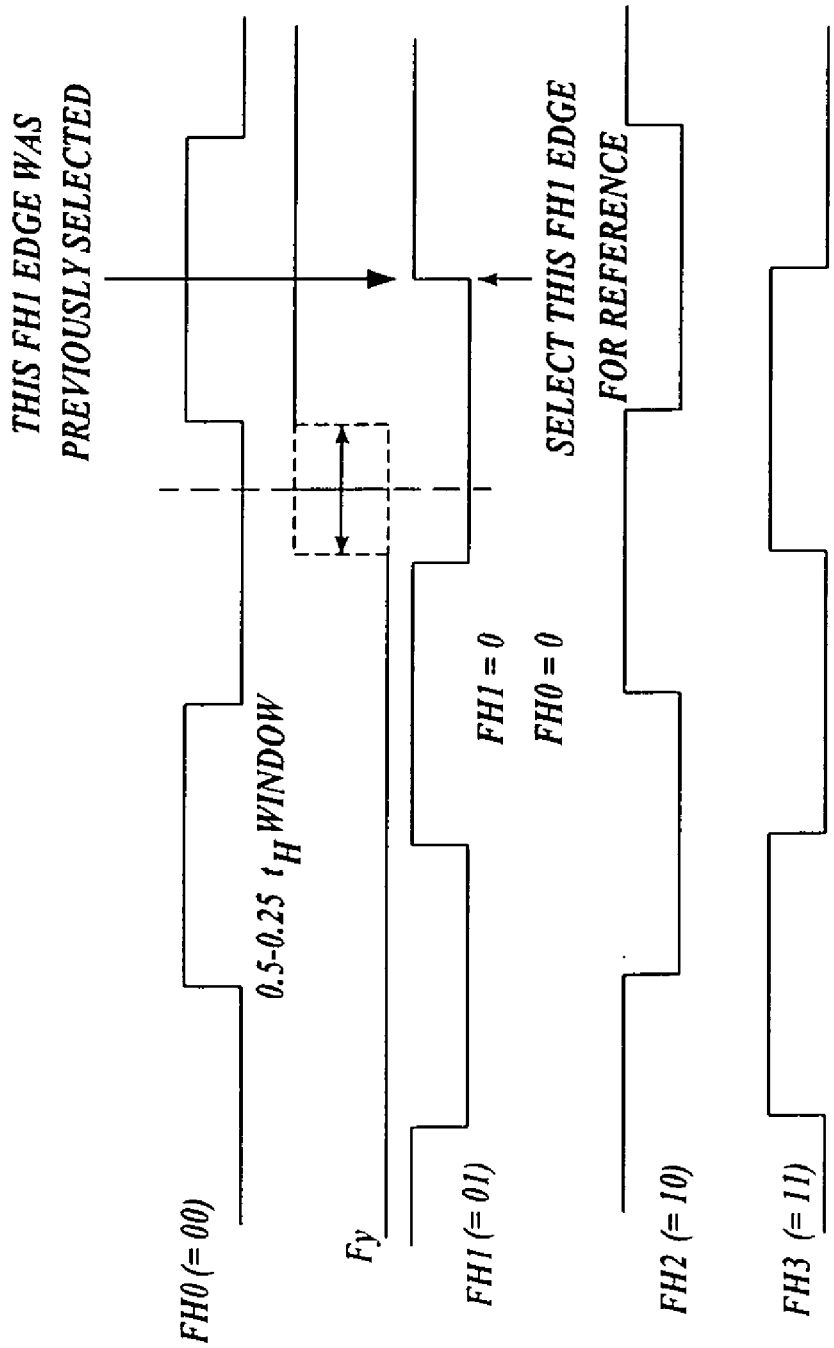

In FIG. 11B, the vertical flyback signal (Fy) occurs within a 0.5–0.25 tH window with respect to the previously selected reference edge. As in FIG. 11A, the rising edge of the vertical flyback signal (Fy) is not relatively coincident, or non-coincident, with the previously selected reference edge. As the vertical flyback signal (Fy) and the selected reference edge are not relatively coincident with one another, the risk of jitter occurring in the vertical position of the OSD window is minimized. Therefore, the phase selection circuit (700) keeps FH1 as the source of the reference horizontal signal (FH(n)) such that the same rising edge of FH1 remains the selected reference edge.

Figure 11C:
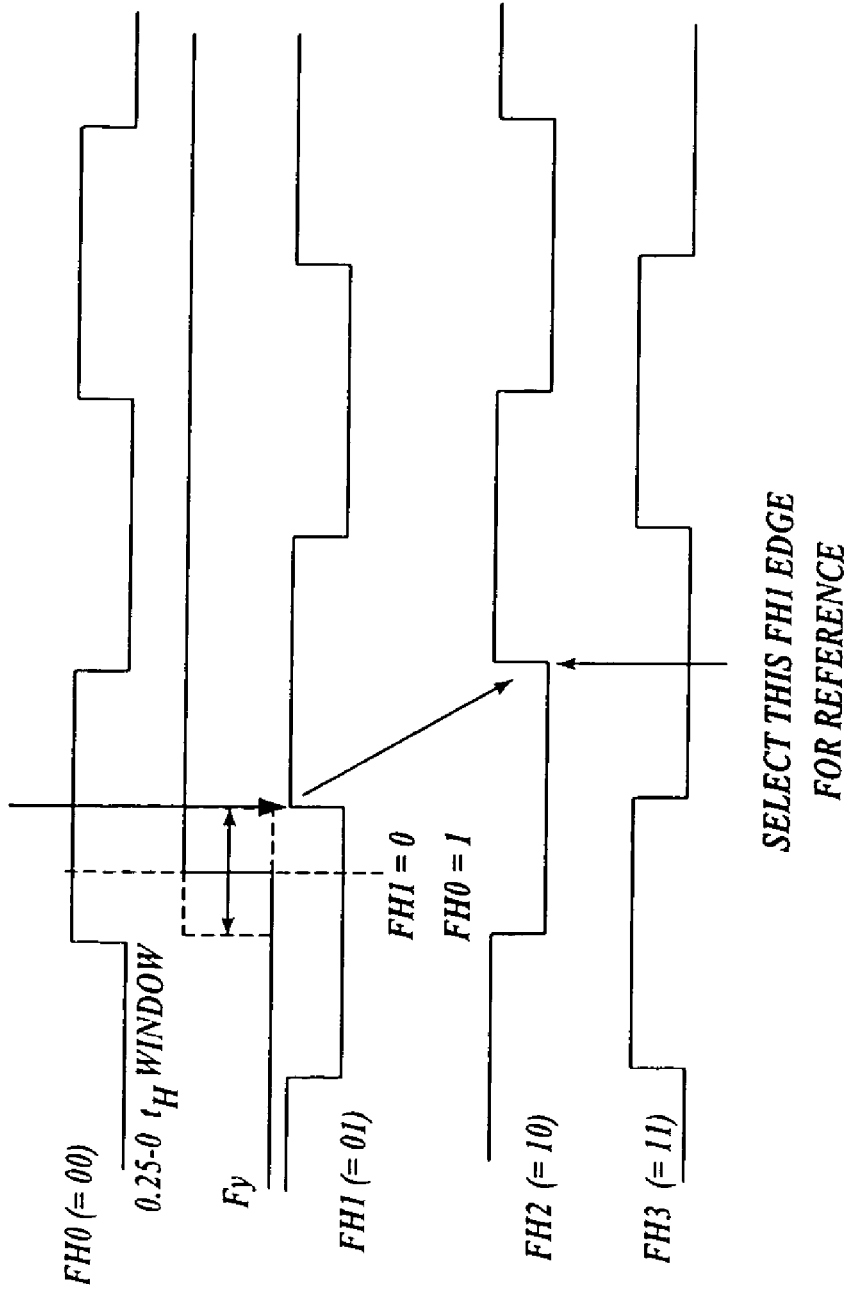

In FIG. 11C, the vertical flyback signal (Fy) occurs within a 0.25–0 tH window with respect to the previously selected reference edge. In this instance, the C3 rising edge of the vertical flyback signal (Fy) is relatively coincident with the previously selected reference edge. The risk of jitter occurring in the vertical position of the OSD window is increased by the vertical flyback signal (Fy) and the reference horizontal signal (FH(n)) occurring closely together in time. Therefore, the phase selection circuit (700) changes the source of the reference horizontal signal (FH(n)). According to the logic table shown in FIG. 8, the source of the reference horizontal signal (FH(n)) is changed from FH1 to FH2 for this example.

Figure 11D:
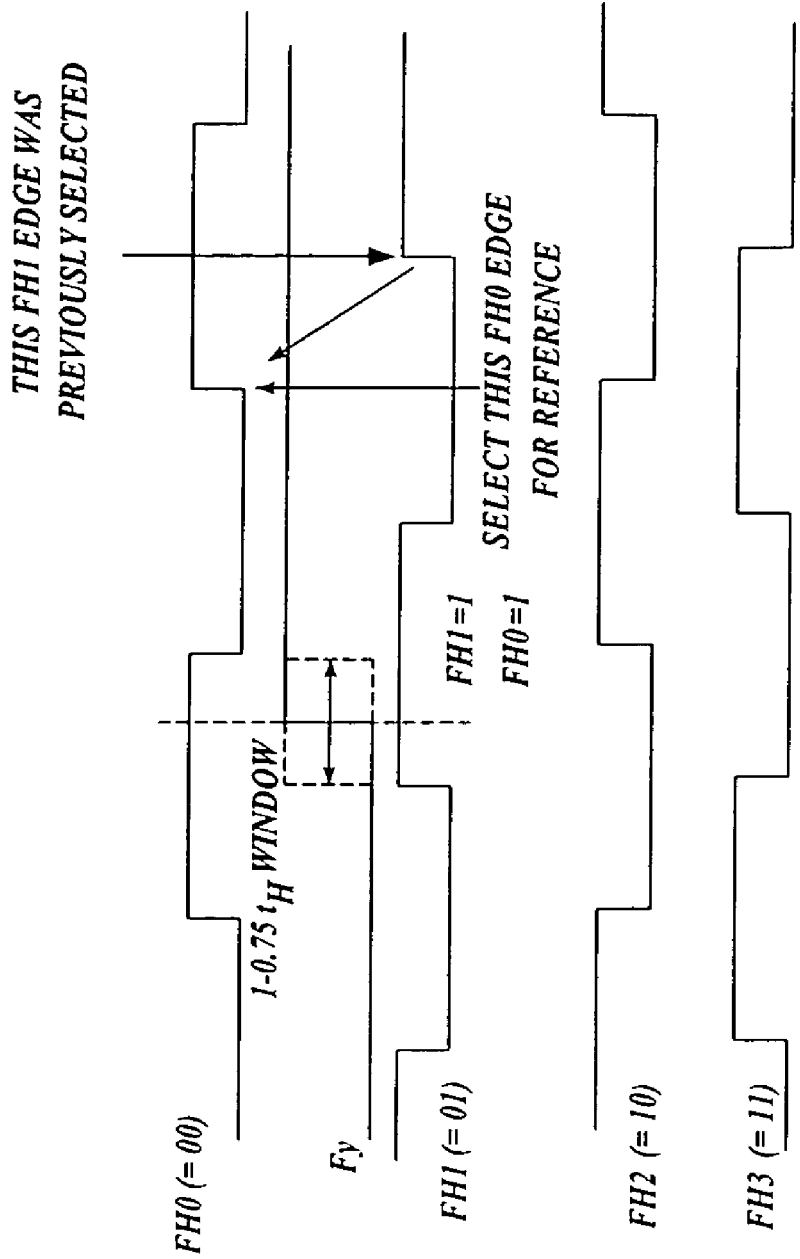

In FIG. 11D, the vertical flyback signal (Fy) occurs within a 1–0.75 tH window with respect to the previously selected reference edge. As in FIG. 11C, the rising edge of the vertical flyback signal (Fy) is relatively coincident with the previously selected reference edge. The risk of jitter occurring in the vertical position of the OSD window is increased by the vertical flyback signal (Fy) and the reference horizontal signal (FH(n)) occurring closely together in time. Therefore, the phase selection circuit (700) changes the source of the reference horizontal signal (FH(n)). According to the logic table shown in FIG. 8, the source of the reference horizontal signal (FH(n)) is changed from FH1 to FH0 for this example.

From the discussion above, it is appreciated and understood that the examples illustrated in FIGS. 11A–11D are not inclusive of all the possible selection scenarios of the phase selection circuit (700). It is also appreciated that other transitions for the same example are possible while still minimizing the occurrence of jitter.

Figure 12:
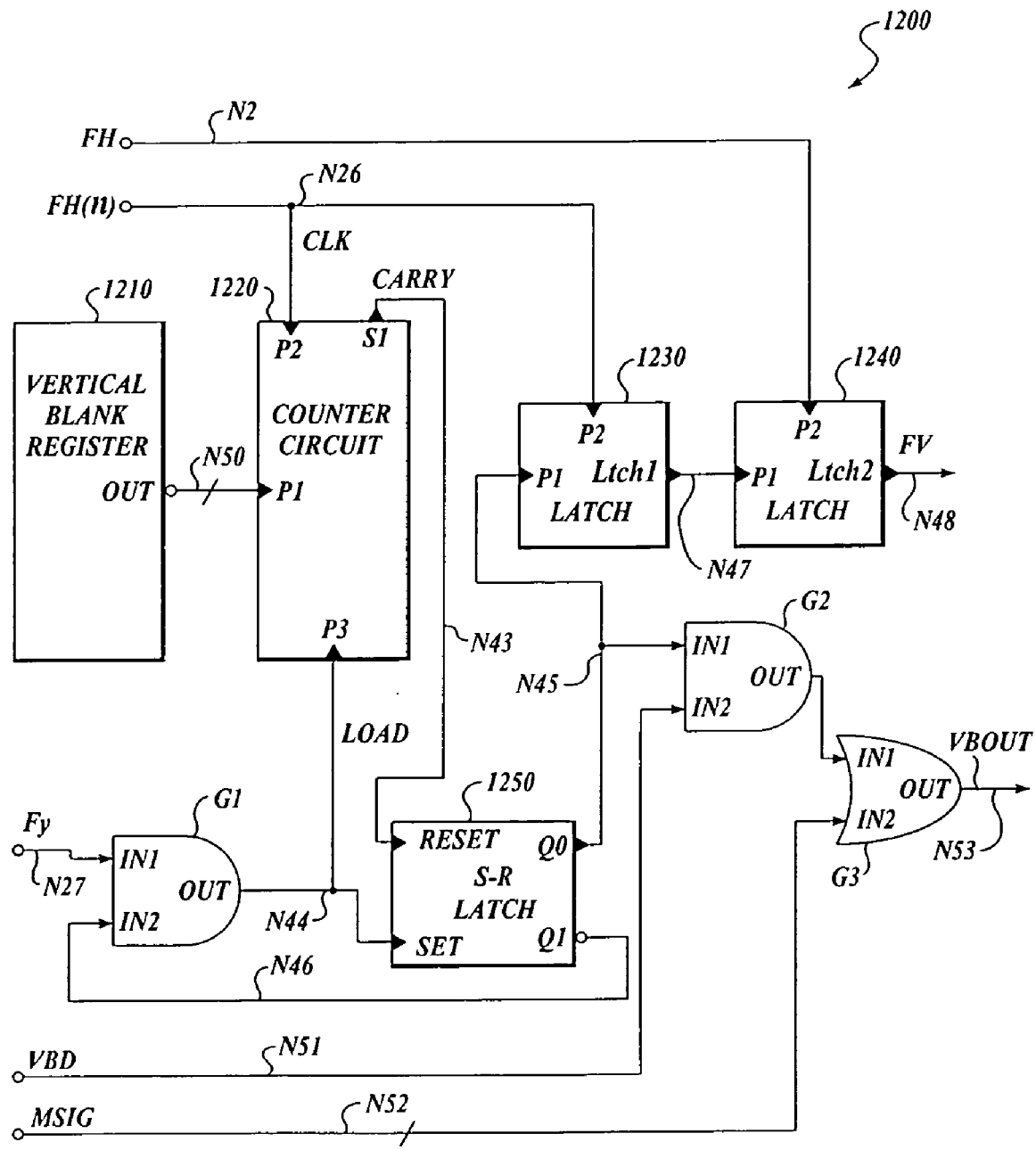
FIG. 12 illustrates a schematic diagram of a blanking circuit.

FIG. 12 illustrates a schematic diagram of a blanking circuit in accordance with the present invention. The blanking circuit (1200) includes a vertical blank register(1210), a counter circuit (1220), two latches(1230, 1240), an S-R latch (1250), and logic gates (G1–G3).

The vertical blank register (1210) includes an output (OUT) that is coupled to node N50. A counter circuit (1220) includes a first input (P1) that is coupled to node N50, a second input (P2) that is coupled to node N26, a third input (P3) that is coupled to node N44, and an output (S1) that is coupled to node N43. The first latch (1230) includes a first input (P1) that is coupled to node 45, a second input (P2) that is coupled to node N26, and an output (Ltch1) that is coupled to node N47. The second latch (1240) includes a first input (P1) that is coupled to node N47, a second input (P2) that is coupled to node N2, and an output (Ltch2) that is coupled to node N48. The first gate (G1) is an AND gate that includes a first input (IN1) that is coupled to node N27, a second input (IN2) that is coupled to node N46, and an output (OUT) that is coupled to node N44. The S-R latch (1250) includes a first input (Reset) that is coupled to node N43, a second input (Set) that is coupled to node N44, a first output (Q0) that is coupled to node N45, and a second output (Q 1) that is coupled to node N46. The second logic gate (G2) is an AND gate that includes a first input (IN1) that is coupled to node N45, a second input (IN2) that is coupled to a node N51, and an output (OUT) that is coupled to node N49. The third logic gate (G3) is a multiple input OR gate that includes a first input (IN1) that is coupled to node N49, a second input (IN2) that is coupled to node N52, and an output (OUT) that is coupled to node N53.

The vertical blank register (1210) is an addressable register that is set with a predetermined number corresponding to an offset. This predetermined number is dependent upon the type of display and the resolution of the display. This offset is pre-loaded into the counter circuit (1220) when triggered by the load signal (LOAD) of the counter circuit (1220). The load signal (LOAD) is produced by the first logic gate (G1) in response to the vertical flyback signal (Fy) and the inverted second output (Q1) of the S-R latch (1250). The counter circuit (1220) begins counting when triggered by the clocking signal (CLK). The clocking signal (CLK) corresponds to the reference horizontal signal (FH(n)). The counter circuit (1220) counts to a number corresponding to the number lines that are blanked from the top of the screen (shown in FIG. 1) before the OSD window is generated. The counter circuit (1220) produces a carry signal (CARRY)) when the counter exceeds its total count. The S-R latch (1250) is reset in response to the carry signal (CARRY). The S-R latch (1250) is set by the load signal (LOAD). The first latch (1230) latches the current level of the first output (Q0) of the S-R latch (1250) when triggered by the reference horizontal signal (FH(n)). The second latch (1240) latches the current level of the output (Ltch1) of the first latch (1230) when triggered by the horizontal rate signal (FH). The output (Ltch2) of the second latch (1240) corresponds to the vertical rate signal (Fv) for the display shown in FIG. 1. The vertical rate signal (Fv) provides the positional timing of the OSD window.

The vertical blanking signal (VBOUT) is produced in response to the first output (Q1) of the S-R latch (1250) and the multi-signal input (MSIG). A vertical blank disable (VBD) signal may be used as the second input (IN2) of the second logic gate (G2). The VBD signal can be used to disable the vertical blanking signal (VBOUT) by asserting a low logic level (logic "0"), which forces the output of the second logic gate (G2) to a low logic level. Other signals contained within the multi-signal input (MSIG) can also be used by the third logic gate (G3) to alter the duration of, eliminate, or be combined with the vertical blanking signal (VBOUT). Such signals may include, but are not limited to, a power save signal, a blank video signal, a horizontal blanking signal, a power ground signal, or other signals associated with producing an image on a display device.

Figure 13:
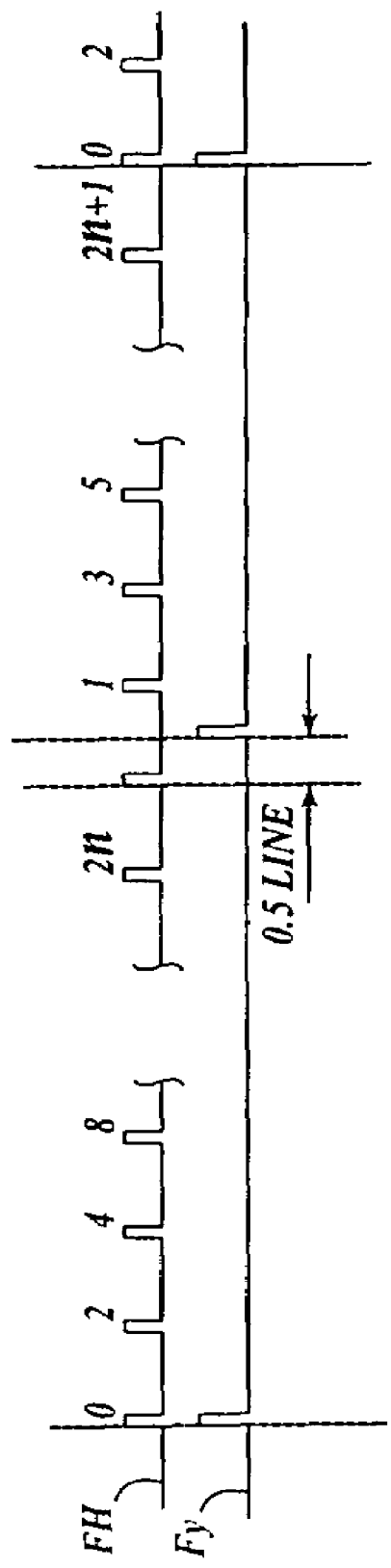
FIG. 13 shows an exemplary timing diagram for an interlace signal for a display device.

FIG. 13 shows an exemplary timing diagram for an interlace signal for a display device. Interlacing is a format for displaying an image on a display screen where half of the horizontal lines comprising the image are displayed during a first vertical frame period and the other half are displayed during a second vertical frame period. The combination of the two vertical frame periods produces a single image on the display. It is shown in the exemplary timing diagram that the even numbered horizontal lines are displayed first, followed by the odd numbered horizontal lines. Interlacing introduces a 50% shift in the duty cycle between the first vertical frame period and the second vertical frame period. This 50% shift is represented in the timing diagram as the 0.5 line shift between the first vertical frame period and the second vertical frame period. For the purpose of the present invention, the shift between each vertical frame period would cause the phase selection circuit (700) shown in FIG. 7 to select a different horizontal clock signal (FH0–FH3) as the source of the reference horizontal signal (FH(n)). Without correction, this 50% shift would cause a jitter in the OSD window as previously described. It is appreciated that for applications that do not allow for an interlace mode to display the image, the present invention can be configured without taking into account this type of correction.

Figure 14:
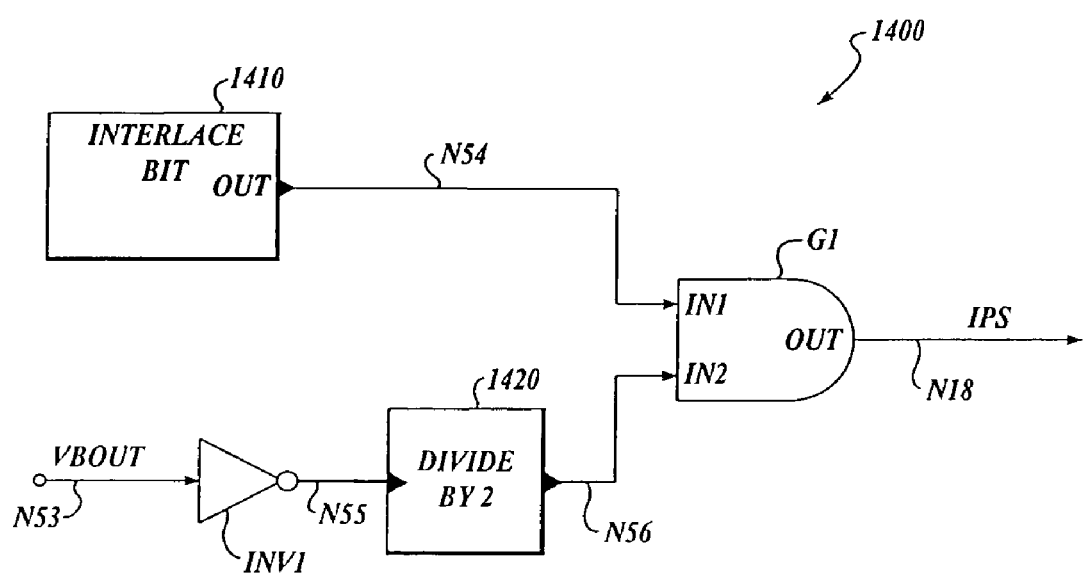
FIG. 14 illustrates a schematic diagram of an optional interlace correction circuit.

FIG. 14 illustrates a schematic diagram of an optional interlace correction circuit. The optional interlace correction circuit (1400) includes an interlace bit (1410), an inverter circuit (11), a divide by two circuit (1420), and a logic gate (G1).

The interlace bit (1410) includes an output (OUT) that is coupled to node N54. The inverter circuit (INV1) is coupled between node N53 and node N55. The divide by two circuit (1420) has an input (IN1) that is coupled to node N53, and an output (OUT) that is coupled to node N54. The logic gate (G1) is an AND gate that includes a first input (IN1) that is coupled to node N54, a second input (IN2) that is coupled to node N56, and an output (OUT) that is coupled to node N18.

A micro-controller (not shown) determines the display mode of the display device. Example display modes include a non-interlaced mode, an interlace mode, or some other type of display mode. The micro-controller sets a register bit, referred to as the interlace bit (1410), when the interlace mode is selected. The vertical banking signal (VBOUT) is used as a timing signal for the interlace correction circuit (1400). The vertical blanking signal (VBOUT) is inverted by inverter circuit INV1, and then divided by 2 by the divide by two circuit (1420). The logic gate (G1) produces the interlace phase shift signal (IPS) in response to the interlace bit (1410) and the output (OUT) of the divide by two circuit (1420). The interlace phase shift signal (IPS) is used by the horizontal clock signal generator (500) to shift the phases of the horizontal clock signals (FH0–FH1) by 180 degrees. This 180 degree phase shift in the horizontal clock signals (FH0–FH1) matches the 50% shift in the duty cycle between the vertical frame periods when the display is in interlace mode. By matching the shift between the each vertical frame period, the interlace phase shift signal (IPS) compensates for any error in generating the OSD window caused by interlace mode.

Figure 15:
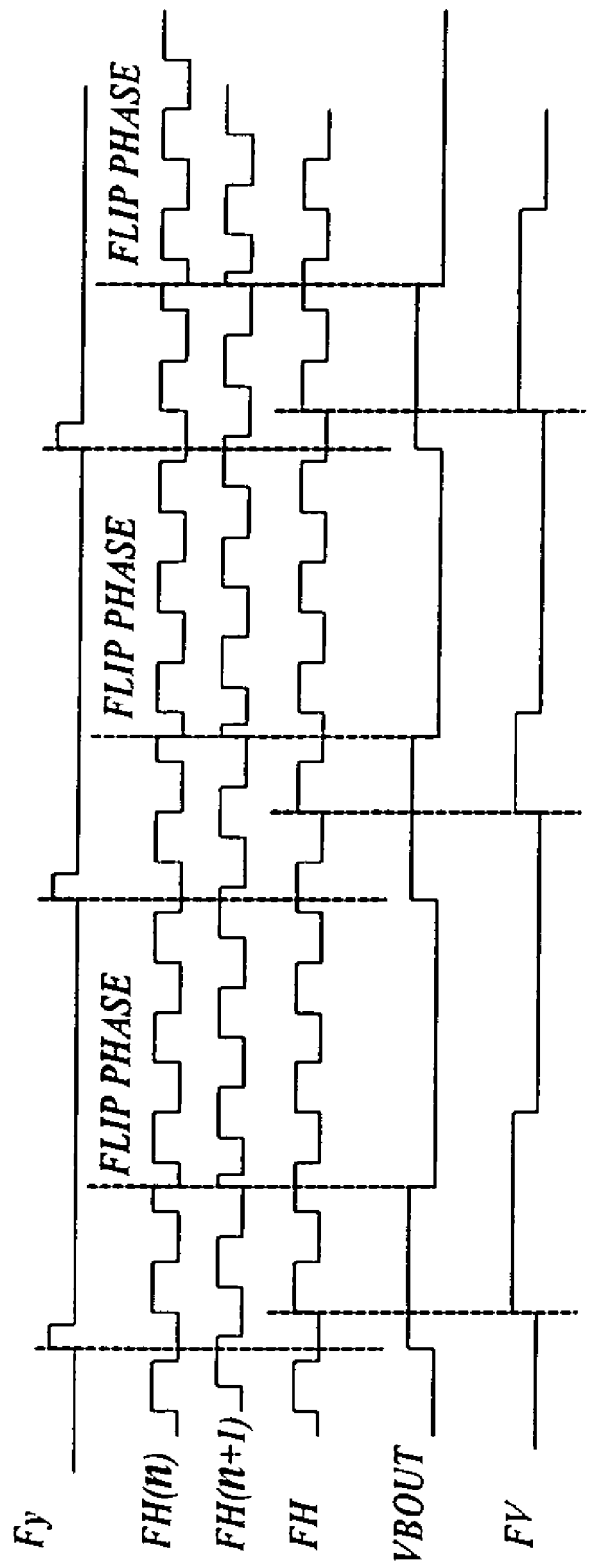
FIG. 15 shows the associated timing diagram of the signals associated with using the interlace correction circuit shown in FIG. 14, in accordance with the present invention.

FIG. 15 shows an exemplary timing diagram of the signals associated with using the interlace correction circuit (1400) shown in FIG. 14. The exemplary timing diagram illustrates the 180 degree shift in the reference horizontal signal (FH(n)) when the vertical blanking signal (VBOUT) is a low logic level (logic "0"). A 180 degree phase shift is comparable to inverting a signal, and therefore appears as a "flip" in the phase. The falling edge of vertical blanking signal (VBOUT) is used to trigger the "flip" in phase prior to the next vertical frame period. The subsequent selected horizontal clock signal (FH(n+1)) also "flips" when the vertical blanking signal (VBOUT) is a low logic level. (For the purpose of this timing diagram, the timing of the signals is not on a linear scale, as the reference horizontal signal (FH(n)) and the subsequent selected horizontal clock signal (FH(n+1)) cannot occur concurrently.) The horizontal rate signal (FH) remains unaffected since it is not used in the horizontal clock signal generator (500). The shift of the reference horizontal signal (FH(n)) stays in phase with interlacing 0.5 line movement illustrated in FIG. 13. The phase is not flipped coincident with the vertical flyback signal (Fy), as this can cause error in the selection of the source of the reference horizontal signal (FH(n)).

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for reducing noise effects associated with the vertical position of an on screen display (OSD) image for a display device that uses a vertical flyback signal and a horizontal flyback signal in producing an image, comprising:
   a clock signal generator that is configured to produce multiple horizontal clock signals in response to the horizontal flyback signal, wherein each multiple horizontal clock signal has a different phase with respect to one another;
   a phase selection circuit that is configured to select one of the multiple horizontal clock signals such that an edge associated with the selected multiple horizontal clock signal is non-coincident with an edge associated with the vertical flyback signal; and
   a blanking circuit that is configured produce a blanking signal in response to the selected multiple horizontal clock signal such that the blanking signal determines the vertical position of the OSD image, whereby noise effects associated with at least one of the vertical flyback signal and the horizontal flyback signal are minimized.

2. The apparatus of claim 1, wherein the horizontal clock signal generator produces the multiple horizontal clock signals in response to a horizontal rate signal and a scaled horizontal rate signal that is produced by a phase-locked loop circuit, wherein the scaled horizontal rate signal has a frequency that is a multiple of another frequency that corresponds to the horizontal rate signal.

3. The apparatus of claim 2, wherein the phase-locked loop circuit produces at least one of the horizontal rate signal and the scaled horizontal rate signal in response to the horizontal flyback signal.

4. The apparatus of claim 2, wherein the scaled horizontal rate signal has a scaled frequency that is double another frequency that corresponds to the horizontal rate signal.

5. The apparatus of claim 2, wherein the horizontal rate signal and the scaled horizontal rate signal are dependent upon a predetermined resolution of the display device.

6. The apparatus of claim 1, further comprising an interlace correction circuit that is arranged to selectively shift the phase of the multiple horizontal clock signals between each vertical frame period to compensate for a one-half line shift in the edge of the vertical flyback signal that occurs when the display device is in an interlace mode.

7. The apparatus of claim 6, wherein the interlace correction circuit produces an interlace phase shift signal that is utilized by the clock signal generator to change the phase of each of the multiple horizontal clock signals.

8. The apparatus of claim 1, wherein the selected horizontal clock signal has an associated clock period, and the selected horizontal clock signal is selected such that the edge associated with the selected horizontal clock signal occurs at least one-quarter of the clock period apart from the vertical flyback signal.

9. The apparatus of claim 1, the phase selection circuit further comprising a combinational logic circuit that is configured to produce logic outputs that determine the selection of one of the multiple horizontal clock signals.

10. The apparatus of claim 9, wherein the combinational logic circuit produces the logic outputs dependent upon a previous selection of one of the multiple horizontal clock signals.

11. The apparatus of claim 1, wherein each adjacent multiple horizontal clock signal is substantially separated by 90 degrees.

12. The apparatus of claim 1, wherein the vertical position of the OSD image is positioned within a display screen of the display device corresponding to a predetermined number of horizontal lines from a starting position on the display screen in response to the blanking signal.

13. A method for minimizing jitter in the vertical position of an on screen display (OSD) image associated with a display device having a display screen, comprising:

producing multiple horizontal clock signals that each have a different phase in response to a first horizontal timing signal and a second horizontal timing signal, wherein the first horizontal timing signal and the second horizontal timing signal are related;

selecting one of the multiple horizontal clock signals as a new horizontal flyback signal such that the occurrence of an edge associated with the selected horizontal clock signal is non-coincident with an edge associated with a vertical flyback signal of the display device; and producing a vertical blanking signal in response to the selected horizontal clock signal wherein the vertical blanking signal triggers the display device to count a predetermined number of blank horizontal lines from the top of the display screen prior to generating the OSD image such that the predetermined number of blank horizontal lines corresponds to the vertical position of the OSD image on the display screen.

14. The method of claim 13, further comprising generating one of the first horizontal timing signal and the second horizontal timing signal by a phase-locked loop circuit in response to a horizontal flyback signal of the display device.

15. The method of claim 13, further comprising correcting the phase of each of the multiple horizontal clock signals for when the display device is operating in an interlace mode.

16. The method of claim 15, further comprising shifting the phase of each of the multiple horizontal clock signals by 180 degrees between each vertical fame period to compensate for a one-half line delay in the edge of the vertical flyback signal that occurs between each vertical frame period when the display device is operating in the interlace mode.

17. The method of claim 13, wherein selecting one of the multiple horizontal clock signals further comprises selecting one of the multiple horizontal clock signals depending on the multiple horizontal clock signal selected for a previous occurrence of the vertical flyback signal.

18. The method of claim 13, wherein producing multiple horizontal clock signals further comprises producing each multiple horizontal clock signal such that each multiple horizontal clock signal has a phase that is 90 degrees apart from each adjacent multiple horizontal clock signal.

19. An apparatus for providing jitter reduction for an on screen display (OSD) window of a display device having a display screen, comprising:

a means for generating horizontal timing signals that is configured to generate a first horizontal timing signal and a second horizontal timing signal, wherein the first horizontal timing signal and the second horizontal timing signal are related;

a means for producing multiple horizontal clock signals that is configured to produce multiple horizontal clock signals in response to the first horizontal timing signal and the second horizontal timing signal such that each of the multiple horizontal clock signals has a different phase;

a means for selecting a multiple horizontal clock signal that is configured to select one of the multiple horizontal clock signals such that the occurrence of an edge corresponding to the selected horizontal clock signal is non-coincident with an edge associated with the vertical flyback signal; and a means for producing a vertical blanking signal that is configured to produce a vertical blanking signal in response to the selected horizontal clock signal, wherein the vertical blanking signal triggers the display device to count a predetermined number of blank horizontal lines from the top of the display screen prior to generating the OSD image such that the predetermined number of blank horizontal lines corresponds to the vertical position of the OSD image on the display screen, whereby jitter in the vertical position of the OSD window is reduced.

20. The apparatus of claim 19, further comprising an interlace correction means that is configured to shift the phase of the multiple horizontal clock signals between each vertical frame period to compensate for a one-half line shift in the edge of the vertical flyback signal that occurs when the display device is in an interlace mode.

21. The apparatus of claim 20, wherein the interlace correction means produces an interlace phase shift signal that is utilized by the clock signal generator to change the phase of each of the multiple horizontal clock signals.

* * * * *

UNITED STATES PATENT AND TRADEMARK OFFICE
CERTIFICATE OF CORRECTION

PATENT NO. : 6,967,688 B1
DATED : November 22, 2005
INVENTOR(S) : Andy Morrish

It is certified that error appears in the above-identified patent and that said Letters Patent is hereby corrected as shown below:

Column 4,
Line 36, change "line count C)" to -- line count from --.

Column 7,
Line 4, change "additional C3 timing signal" to -- additional timing signal --.

Column 8,
Line 29, change "two-tines" to -- two-times --.

Column 13,
Line 17, change "the C3 rising edge" to -- the rising edge --.

Column 15,
Line 14, change "(11)" to -- (INV1) --.
Line 26, change "configured produce" to -- configured to produce --.

Signed and Sealed this

Sixteenth Day of May, 2006

JON W. DUDAS
*Director of the United States Patent and Trademark Office*